(12) United States Patent  
Barron et al.

(10) Patent No.: US 10,274,508 B2  
(45) Date of Patent: Apr. 30, 2019

(54) SYSTEM AND METHOD FOR ISOLATING INERTIAL AND NON INERTIAL VELOCITIES IN THE OCEAN

(71) Applicants: Charlie N. Barron, Slidell, LA (US); Peter L. Spence, Diamondhead, MS (US); Lucy F. Smedstad, Slidell, LA (US)

(72) Inventors: Charlie N. Barron, Slidell, LA (US); Peter L. Spence, Diamondhead, MS (US); Lucy F. Smedstad, Slidell, LA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 386 days.

(21) Appl. No.: 14/731,493

(22) Filed: Jun. 5, 2015

(65) Prior Publication Data

US 2015/0355214 A1   Dec. 10, 2015

Related U.S. Application Data

(60) Provisional application No. 62/010,222, filed on Jun. 10, 2014.

(51) Int. Cl.
*G01P 5/00* (2006.01)

(52) U.S. Cl.
CPC .................. *G01P 5/001* (2013.01)

(58) Field of Classification Search
CPC .................................................. G01P 5/001
See application file for complete search history.

(56) References Cited

U.S. PATENT DOCUMENTS 4,335,433 A * 6/1982 Bauer .................. G01C 21/00  
                                                                                                   701/472  
2009/0287414 A1* 11/2009 Vickery ............... G01C 21/165  
                                                                                                   701/500

(Continued)

OTHER PUBLICATIONS

R.T. Pollard, On the generation by winds of inertial oscillations in the ocean, Deep Sea Research, 17, 795 812, 1970.

(Continued)

*Primary Examiner* — Hyun D Park  
(74) *Attorney, Agent, or Firm* — US Naval Research Laboratory; William P. Ladd

(57) ABSTRACT

Embodiments relate to a system and methods for isolating the inertial and non-inertial components of a velocity field in a body of water, and further provides methods for predicting a path of an object in a body of water and for identifying an initial location in the water at which an object should be placed so that it travels to a desired location. The methods in some cases can partition a time series of velocity fields into inertial and non-inertial components in such a way that accounts for the variation of the inertial period over the range of latitudes within the field and maintains the fidelity of non-inertial variability over both shorter and longer time scales. The embodiments seperate the less-reliable inertial components from the more-reliable non-inertial background, enabling straightforward calculation of transport due to the non-inertial flow and evaluation of the superposition of inertial oscillations.

3 Claims, 29 Drawing Sheets

(56) References Cited

U.S. PATENT DOCUMENTS

| | | | | |
|---|---|---|---|---|
| 2010/0274488 | A1* | 10/2010 | Kenney | G01V 11/00 |
| | | | | 702/5 |
| 2013/0063304 | A1* | 3/2013 | O'Regan | G01S 5/0027 |
| | | | | 342/357.55 |
| 2015/0300822 | A1* | 10/2015 | Strong | G01C 21/12 |
| | | | | 701/21 |

OTHER PUBLICATIONS

R.T. Pollard and R.C. Millard, Comparison between observed and simulated wind generated inertial oscillations, Deep Sea Research, 17, 813 821, 1970.

P. Kundu, An analysis of inertial oscillations observed near Oregon coast, Journal of Physical Oceanography, 6, 879 893, 1976.

A.C. Vastano and C.N. Barron, Comparison of satellite and drifter surface flow estimates in the northwestern Gulf of Mexico, Continental Shelf Research, 14, 589 605, 1994.

J. H. Park and D.R. Watts, Near inertial oscillations interacting with mesoscale circulation in the southwestern Japan/East Sea, Geophysical Research Letters, 32, L10611, doi:10.1029/2005GL022936, 2005.

L. Crosnier, B. Barnier, and A.M. Treguier, Aliasing inertial oscillations in a $\frac{1}{6}°$ Atlantic circulation model: impact on the mean meridional heat transport, Ocean Modelling, 3, 21 31, 2001.

T. Penduff, B. Barnier, J. M. Molines, and G. Madec, On the use of current meter data to assess the realism of ocean model simulations, Ocean Modelling, 11, 399 416, 2006.

T. Bengtsson, R. Milliff, R. Jones, D. Nychka, and P.P. Niiler, A state space model for ocean drifter motions dominated by inertial oscillations, Journal of Geophysical Research, 110, C10015, doi:10.1029/ 2004JC002850, 2005.

C.N. Barron, L.F. Smedstad, J.M. Dastugue, and O.M. Smedstad, Evaluation of ocean models using observed and simulated drifter trajectories: Impact of sea surface height on synthetic profiles for data assimilation, Journal of Geophysical Research, 112, C07019, doi: 10.1029/2006J0002982, 2007.

\* cited by examiner

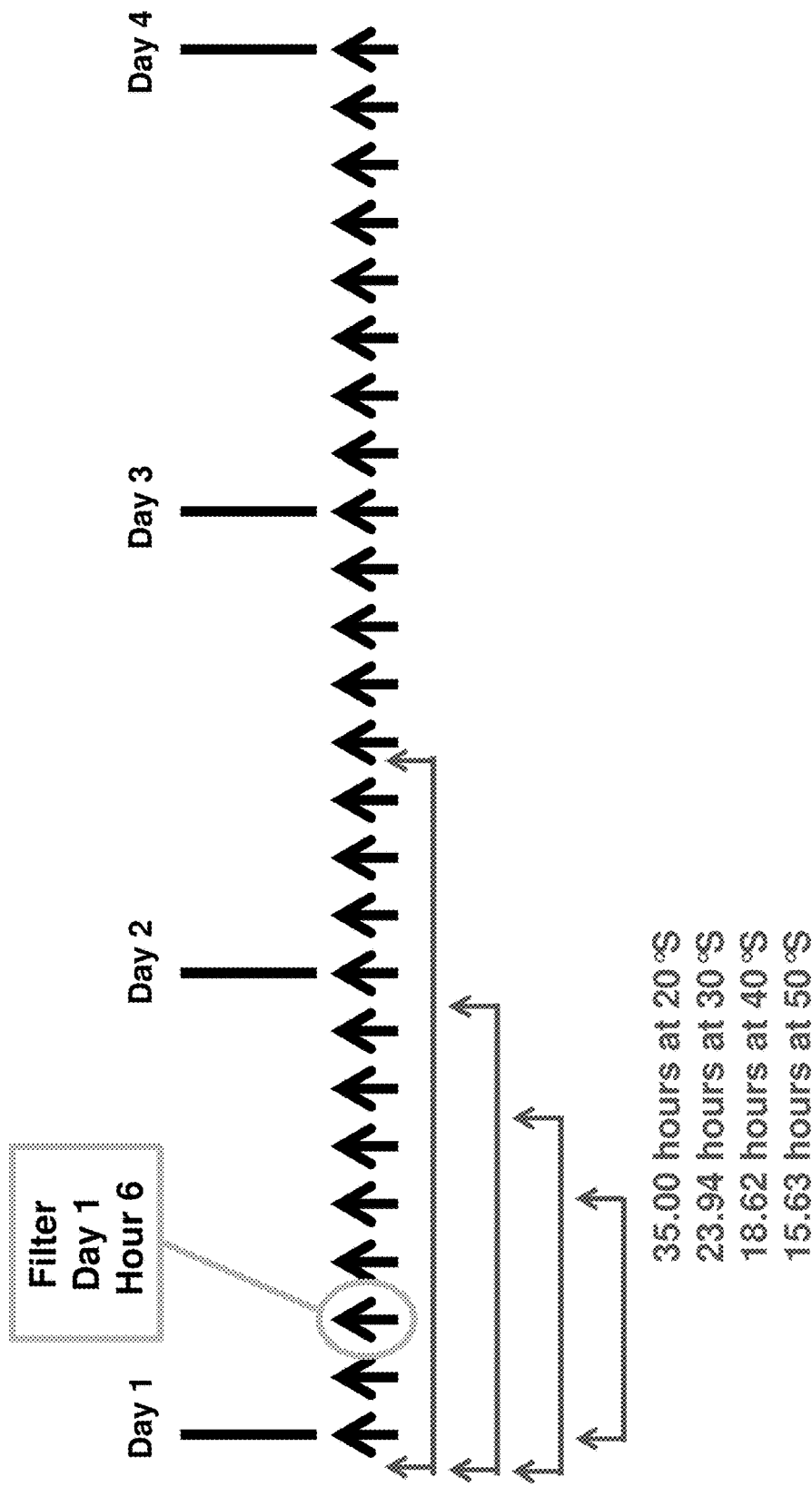

SYSTEM AND METHOD FOR ISOLATING INERTIAL AND NON INERTIAL VELOCITIES IN THE OCEAN

CROSS-REFERENCE

This Application is a Non-Provisional of and claims the benefit of priority under 35 U.S.C. § 119 based on U.S. Provisional Patent Application No. 62/010,222 filed on Jun. 10, 2014, the entirety of which is incorporated into the present disclosure.

TECHNICAL FIELD

Systems and methods disclosed herein relate generally to isolating the inertial and non-inertial components of velocities in the velocity field of a fluid such as an ocean.

BACKGROUND

Prediction of ocean velocities is often followed with drift prediction, a prediction of where the currents will transport a passive object from a known starting time and location, or predictions of how the ocean currents will alter the trajectory or transit time of a powered object moving through the water. Examples of usage of drift prediction include rescue and recovery, placement of instruments, and selection of a path to improve vessel fuel efficiency. Having an accurate analysis of current speed and direction is key to accurately representing drift prediction.

The inclusion of inertial oscillations in such drift predictions can adversely affect their accuracy, particularly in cases of predictions made on time scales shorter than a week. The term "inertial oscillations" is used to refer to the transverse waves in rotating fluids that are restored due to an apparent force associated with the Coriolis effect within a non-inertial reference frame fixed on a rotating planet, with the terms "inertial component" or "inertial velocity" often being used to refer to the inertial oscillation component of a velocity in a body of water due to the Coriolis effect. The restoring Coriolis effect is strongest at the poles and zero at the equator. Inertial oscillations are observed in nature, their dynamics have been described, and they continue to be the subject of investigation. If the fluid velocities are described relative to a rotating reference frame such as a latitude-longitude grid on the rotating earth, a straight-line motion relative to an inertial (non-rotating) reference frame appears to be accelerated by an apparent Coriolis force. For example, in the northern hemisphere, velocities appear to be accelerated to the right of their forward motion, while in the southern hemisphere they appear to be accelerated to the left.

Current velocities include both inertial oscillations and background flow components. The "background flow" is what remains from the velocity field after the inertial oscillations are removed. For most of the ocean basins, away from land, and under moderate winds, currents of the background flow are geostrophically balanced, with the pressure gradient due to the topography of the ocean surface balanced by an opposite Coriolis term. Both the inertial oscillations and background flow can have similar amplitudes. However, since inertial oscillations are periodic, their effect on the net long-term displacement or transport of the fluid is secondary to the effect of the non-inertial background flow, with any net transport during one-phase of the inertial oscillation being largely counterbalanced by the return flow during the opposite phase.

This process is well understood and has been the subject of a long history of theoretical studies and observational reports, for example, R. T. Pollard, *On the generation by winds of inertial oscillations in the ocean, Deep-Sea Research*, 17, 795-812, 1970; R. T. Pollard and R. C. Millard, *Comparison between observed and simulated wind-generated inertial oscillations, Deep-Sea Research*, 17, 813-821, 1970; P. Kundu, *An analysis of inertial oscillations observed near Oregon coast, Journal of Physical Oceanography*, 6, 879-893, 1976, and A. C. Vastano and C. N. Barron, *Comparison of satellite and drifter surface flow estimates in the northwestern Gulf of Mexico, Continental Shelf Research*, 14, 589-605, 1994, all of which are hereby incorporated into the present disclosure in their entirety.

An exemplary velocity field having no filtering, which includes misleading inertial oscillations as predicted, is illustrated in FIG. 1A (PRIOR ART). Each bold black arrow in FIG. 1A represents an instantaneous velocity field. For example, the circled arrow represents the instantaneous field at hour 15:00 on day 2. Collectively, the black arrows represent a time series of velocity fields sampled every three hours from the start of day 1 to the start of day 4. The line segments with arrows at the endpoints represent time windows of different durations centered on the selected velocity field, in this case hour 15:00 on day 2. The inertial period as a function of latitude is given by 11.97 hours divided by the sine of the latitude. The durations of the time windows correspond to inertial periods at different latitudes; in this case, the largest period, 35.00 hours, corresponds to the inertial period at 20° S latitude while the shortest period, 15.63 hours, corresponds to the inertial period at 50° S latitude. FIG. 1A and similar figures are used to convey the absence or implementation of different filters to remove inertial period oscillations.

In examining a time series of daily snapshots for purposes of predicting flow of possible debris, higher frequency variability in the flow field can hinder identification of the dominant flow patterns. For example, inertial oscillations can obscure the background flow and therefore can hinder interpretation of velocity field time series. Because of the small net effect of inertial oscillations on transport with duration longer than the inertial period, inertial oscillations can be misleading if an instantaneous representation of a velocity field is used to convey such drift tendencies.

Several methods have been developed to filter inertial oscillations out of a velocity time series. For example, some isolate the inertial oscillations at a single latitude using a precise filter for that single latitude or over a broad field using a broad, multiple-day time average that may span multiple inertial periods and will suppress both inertial and non-inertial variations. These methods, are not well-suited for a time series of flow fields computed to predict flow that captures variations on time scales shorter than a day.

This use of a single number for the inertial period uniquely determined at the latitude of a fixed observation such as a moored current meter has been used to isolate the inertial motion using a sharp bandpass filter as shown in, for example, Kundu, supra.

In some prior art methods, this approach has also been applied over a limited area where the range of the inertial period is small enough to be considered uniform among all points under consideration. For example, J.-H. Park and D. R. Watts, *Near-inertial oscillations interacting with mesoscale circulation in the southwestern Japan/East Sea, Geophysical Research Letters*, 32, L10611, doi:10.1029/2005GL022936, 2005, the entirety of which is incorporated by reference into the present disclosure, uses a narrow band filter with a single inertial period representing periods over the range of latitudes occupied by moored instruments in the Japan/East Sea.

An exemplary velocity field having a uniform filter for a central latitude that aliases inertial oscillations at different latitudes is illustrated in FIG. 1B (PRIOR ART), where the 20.87 hour window corresponding to a latitude of 35° S is in various levels of error when applied with velocities at other latitudes that have a range of inertial periods indicated by their respective time period lines and values. Thus, this method is limited in that it aliases inertial oscillations into the non-inertial flow if the span of latitudes is too large.

Still other applications have chosen to mask inertial oscillations by averaging over long time periods to suppress both inertial oscillations and all other current variations with period shorter than the averaging window. For example, L. Crosnier, B. Barnier, and A. M. Treguier, *Aliasing inertial oscillations in a ⅙° Atlantic circulation model: impact on the mean meridional heat transport*, Ocean Modelling, 3, 21-31, 2001, the entirety of which is incorporated by reference into the present disclosure, reports on the effects of this aliasing when examining model flow predictions over large areas; their solution is to apply a 5-day mean that damps all higher-frequency variations including inertial oscillations. The 5-day filter was also used by T. Penduff, B. Barnier, J.-M. Molines, and G. Madec, *On the use of current meter data to assess the realism of ocean model simulations*, Ocean Modelling, 11, 399-416, 2006, the entirety of which is incorporated by reference into the present disclosure.

An exemplary very long uniform filter that smooths all inertial oscillations and shorter-term variations is illustrated by the line segment covering a 120-hour window in FIG. 1C (PRIOR ART). This period is much longer than the range of inertial periods shown by the other time period lines and values.

The disadvantage of the long-term mean is that it eliminates both inertial and non-inertial variability over shorter time scales, and it is precisely the shorter time scales of the non-inertial velocity component that are needed in drift predictions for search and recovery or other applications. In general, errors in predicting non-inertial variations are less damaging because they are not sustained by the natural mode that propagates inertial oscillations. We are seeking a method that eliminates inertial variations while allowing other periods of variability that are more reliably forecast.

Another alternative to our methods is to strive to precisely determine the true inertial oscillations present in a drifter motion. If the inertial oscillations are correct, then they do not need to be filtered out. Such an approach is taken by T. Bengtsson, R. Milliff, R. Jones, D. Nychka, and P. P. Niiler, *A state-space model for ocean drifter motions dominated by inertial oscillations*, Journal of Geophysical Research, 110, C10015, doi:10.1029/2004JC002850, 2005, the entirety of which is incorporated by reference into the present disclosure, which provides a method to estimate the Coriolis parameter and atmosphere-ocean coupling coefficients from an analysis of the inertial oscillations captured by drifter trajectories. This method requires detailed observations of actual drift, and requires extensive calculations to determine how drift in a particular event reveals the coupling in that event between the ocean and atmosphere. While this approach is instructive for understanding the circumstances of a particular event of ocean coupling, it is well beyond the scope of the routine applications over broad regions envisioned for the proposed filter patent.

Thus, if inertial oscillations are the dominant source of confusion for interpreting the flow predictions, what is needed is a method for suppressing the inertial oscillations while maintaining other variations over time periods of less than a day.

What is further needed is a system that (a) combines robust applicability over a field with a large range in latitude and (b) preserves the shorter-time scale non-inertial components of the signal that are essential for flow and transport calculations in search and rescue or other wide-area ocean drift applications.

What is still further needed is a system that (a) is applicable not only at points or over small areas where the inertial period can be safely approximated as constant, but also over large areas encompassing a range of inertial period values, (b) distinguishes inertial and non-inertial velocity components, which can be used individually or in combination by subsequent drift estimates or other applications, (c) maintains shorter-time scale non-inertial components within the non-inertial velocity components, enabling drift calculations to make use of these more robust predictions while removing the less certain inertial components, (d) can be easily extended to a variety of time-filters, so long as the filter can be applied as a function of the local inertial period, (e) does not require calculation of the true contribution of inertial oscillations within a particular drift event based on specialized supporting observations and extensive calculations, and (f) can produce output that is applicable to flow and transport calculations in search and rescue or other wide-area ocean drift applications.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a system and methods for isolating the inertial and non-inertial components of a velocity field in a body of water, and further provides methods for predicting a path of an object in a body of water and for identifying an initial location in the water at which an object should be placed so that it travels to a desired location.

The methods in accordance with one or more aspects of the present invention can partition a time series of velocity fields into inertial and non-inertial components in such a way that accounts for the variation of the inertial period over the range of latitudes within the field and maintains the fidelity of non-inertial variability over both shorter and longer time scales. The system and method can facilitate flow interpretations and drift predictions by separating the less-reliable inertial components from the more-reliable non-inertial background, enabling straightforward calculation of transport due to the non-inertial flow and evaluation of the superposition of inertial oscillations, which can be subject to significant errors in phase and can be sources of shorter-term uncertainty.

A method for isolating the inertial and non-inertial components of a velocity field in a body of water using a filtered time series in accordance with one or more aspects of the present invention can includes the steps of calculating a weighted average of velocities within a filter window, the weighted average calculated at each time step comprising the isolated non-inertial component of the velocity field at that location and that time step. This weighted average is calculated for each location in the velocity field to find the isolated non-inertial component of the velocity field. The weighted average for each location is then subtracted from each velocity in the velocity field associated with that location to find the isolated inertial component of the velocity field.

BRIEF DESCRIPTION OF THE DRAWINGS

FIGS. 5A-5F are graphical displays illustrating the progression of time filters over a series of time steps from the start of the velocity time series to a time less than half the maximum inertial period after the start.

DETAILED DESCRIPTION

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The problems set forth above as well as other problems are solved by the present teachings. These solutions and other advantages are achieved by the various embodiments of the teachings described herein below.

The system and method of the present invention automatically isolates the inertial and non-inertial components of a velocity field in a large body of water such as an ocean. In some embodiments, the system and method starts with a time series of modeled velocity field from a numerical model such as the Hybrid Coordinate Ocean Model (HYCOM), while in other embodiments, the system and method begins with input data of a plurality of unfiltered velocities and field times and corresponding longitude and latitude over a geographic area.

A velocity field analyzed using one or more aspects of the present invention is 2-dimensional in space and 1-dimensional in time. In time, there is a constant interval between time steps, and, at each time step, there is a distribution in the velocity field in latitude and longitude. The filter window varies in width depending on the latitude at which the velocities are filtered. Each of the points at a particular latitude is subjected to the same filter during the time series, with all the longitudinal points at that latitude being filtered in the same way. The time-averaged velocities are the best estimates of the non-inertial velocities at each location in the field, that is, the velocity field that remains once the inertial oscillations are removed. These new velocities can be used to calculate the drift trajectory of objects in the ocean by integrating the velocity field. Such calculations can be used to locate objects based on their transport within the ocean, determine the path of a vessel in order to reduce its average fuel consumption, or determine an optimum location to place an object in the ocean to obtain a desired transport of the object.

Figure 1A:
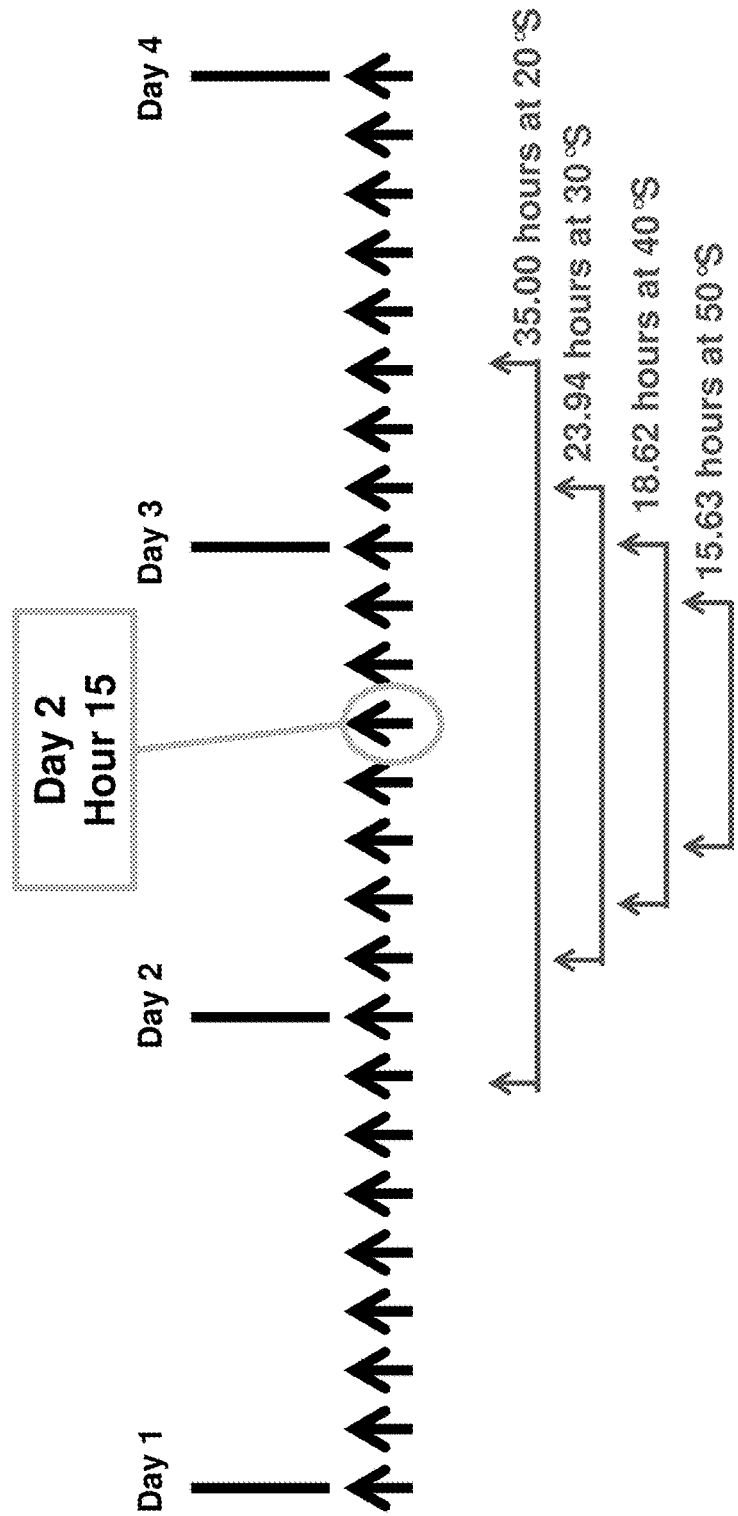
FIGS. 1A-1C are graphical displays illustrating prior art methods for analyzing a velocity field, with FIG. 1A illustrating a prior art method having no filtering, FIG. 1B illustrating a prior art method utilizing a uniform filter for a central latitude and FIG. 1C illustrating a prior art method utilizing a very long uniform filter.

It will be noted here that in the illustration shown in FIG. 1A and in other similar FIGURES, each vertical arrow represents a velocity in the velocity field at a particular point in time over a period of four days, with the arrows being separated by three-hour intervals, though of course other periods of time and/or other time step intervals may be utilized. Although all arrows in the FIGURES have the same magnitude and direction, this is for ease of illustration only, and one skilled in the art will readily appreciate that these represent velocities that may vary widely in magnitude and/or direction over time.

In addition, FIG. 1A and other similar FIGURES, also show a visual representation of four different time periods associated with four different exemplary latitudes, 20 degrees south of the equator (20° S), 30 degrees south of the equator (30° S), 40 degrees south of the equator (40° S), and 50 degrees south of the equator (50° S), are shown. The four different time periods correspond to the periods of inertial oscillation of the ocean velocities at those four different latitudes. The time periods—and thus "width" of the visual representation of those time periods—are shorter at 50° S, (closer to the South Pole) because the period of the inertial oscillation is shorter at the poles than it is closer to the equator. Thus, as shown in the FIGURES, and as described in more detail below, the non-inertial components of the velocities in the velocity field corresponding to a location having a latitude of 20° S are isolated by averaging the velocities over an inertial period of 35 hours, whereas the non-inertial components of the velocities in the velocity field corresponding to a location having a latitude of 50° S are isolated out by averaging the velocities over an inertial period of 15.63 hours.

As noted above, the present invention provides systems and methods for isolating the inertial and non-inertial components of velocities in a velocity field in a body of water.

Figure 2:
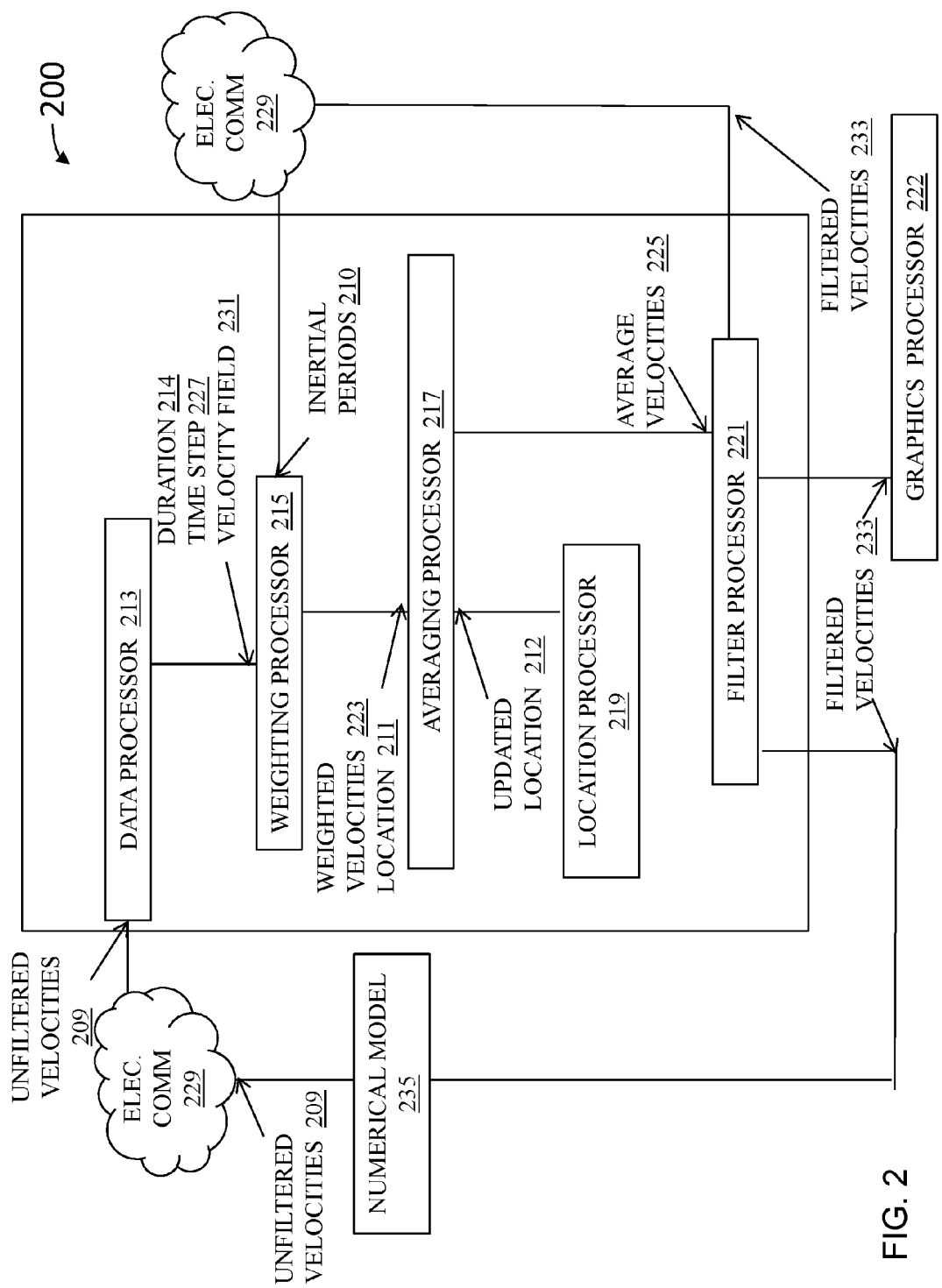
FIG. 2 is a schematic block diagram of an exemplary embodiment of a system for isolating inertial oscillations from a velocity field in accordance with one or more aspects of the present invention.

Aspects of an exemplary embodiment of a system that can be used to isolate the inertial and non-inertial velocity components in accordance with the present invention are illustrated in FIG. 2.

Referring now to FIG. 2, a system 200 for filtering inertial oscillations from a numerical model velocity field can include a data processor 213 configured to receive data of unfiltered velocities 209 in a velocity field in a geographic area of interest. The velocity field data includes data of a plurality of velocities in a geographic area of interest over a period of time and further includes data of a corresponding plurality of locations associated with each velocity, the location data comprising data of their latitude and longitude in the geographic area. In some embodiments, unfiltered velocity data 209 can be received from sensors or other sources of data measured in the geographic area of interest, while in other embodiments, unfiltered velocity data 209 can comprise modeled data input from a numerical model 235 via any suitable means of electronic communication 229.

Data processor 213 also receives data specifying a specific location 211 at which the velocity field data is to be filtered, data specifying the duration 214 of a filtering and a time step 227, and data of the latitudes covered by the velocity field 231 and provides this data, along with the velocity field data 209, to a weighting processor 215.

Weighting processor 215 is configured to determine inertial periods 210 appropriate for the latitudes in the velocity field 231, though in some embodiments, weighting processor can simply receive data of such inertial periods 210, e.g., through electronic communications 229. Weighting processor 215 is further configured to apply weights equal to the output field time step 227 for a specific time in the time series divided by inertial period 210 for a specific location 211 in the geographic area of interest. System 200 can also include averaging processor 217 configured to compute average velocity 225 for each location 211 in the velocity field 231 by averaging weighted velocities 223 at location 211 over inertial period 210 for location 211 or updated location 212.

System 200 can also include location processor 219 configured to determine an inertial period 210 for a current position in the time series and to provide updated location 212 when necessary, where the updated location 212 is computed when inertial period 210 changes as computations proceed through velocity field 231.

System 200 can still further include filter processor 221 configured to subtract average velocities 225 from velocity field 231 to eliminate the inertial component from velocity field 231 and to create filtered velocities 233. These filtered velocities can then be provided to, for example, numerical model 235 or graphics processor 222 for further processing.

Figure 3A:
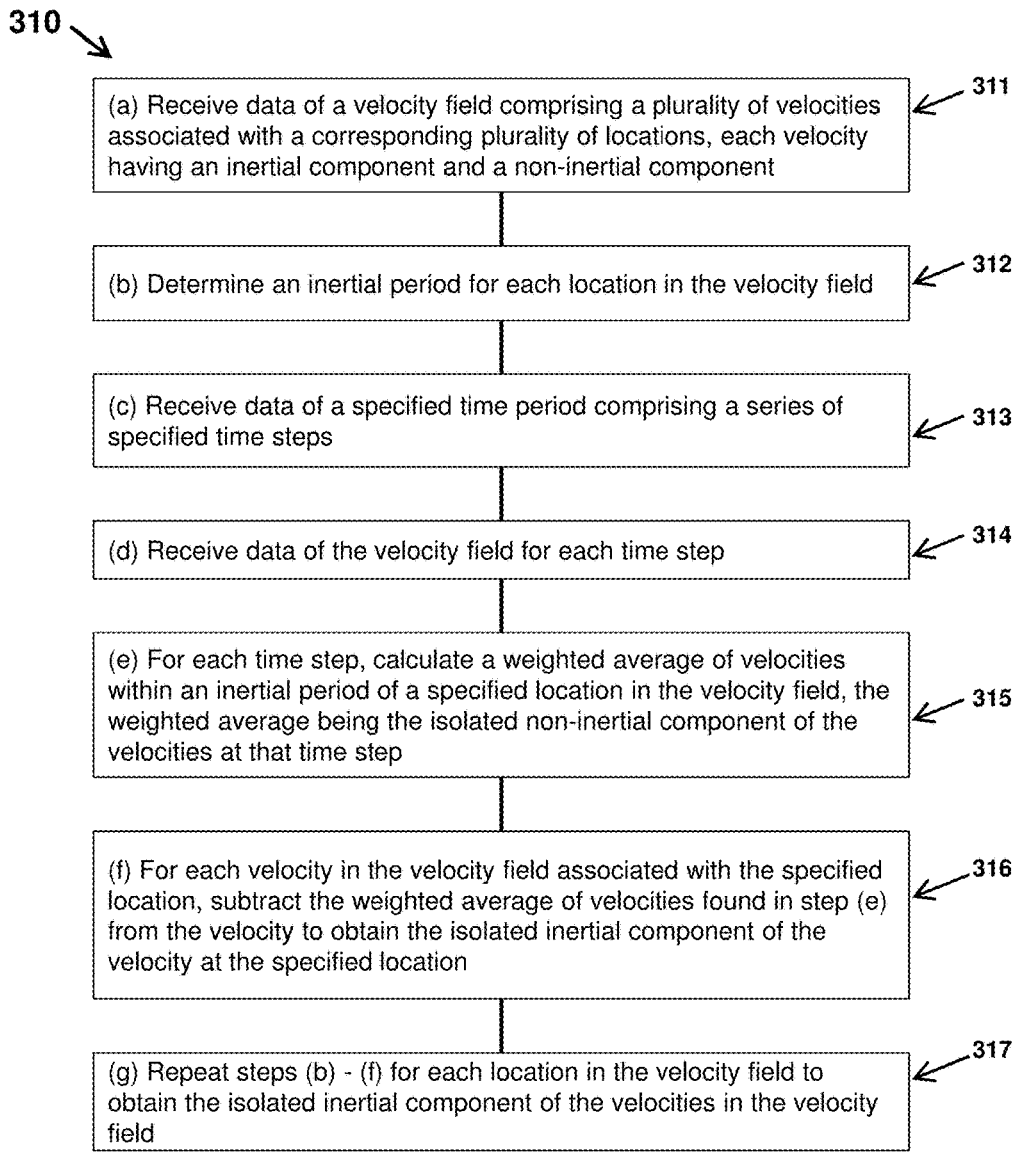
FIGS. 3A-3C are flowcharts illustrating various embodiments of a method for isolating inertial oscillations from a velocity field in accordance with one or more aspects of the present invention.
Figure 3B:
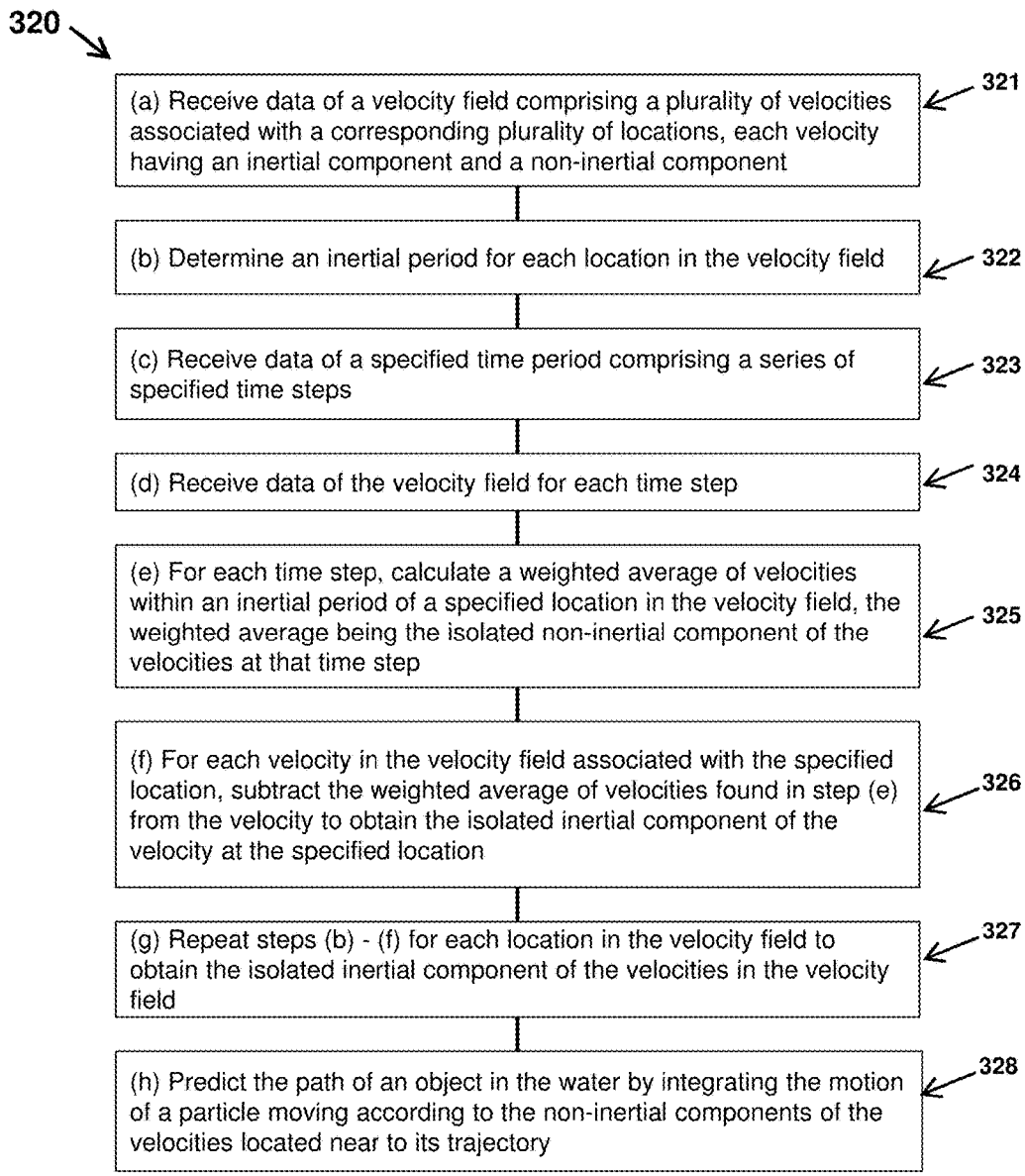
Figure 3C:
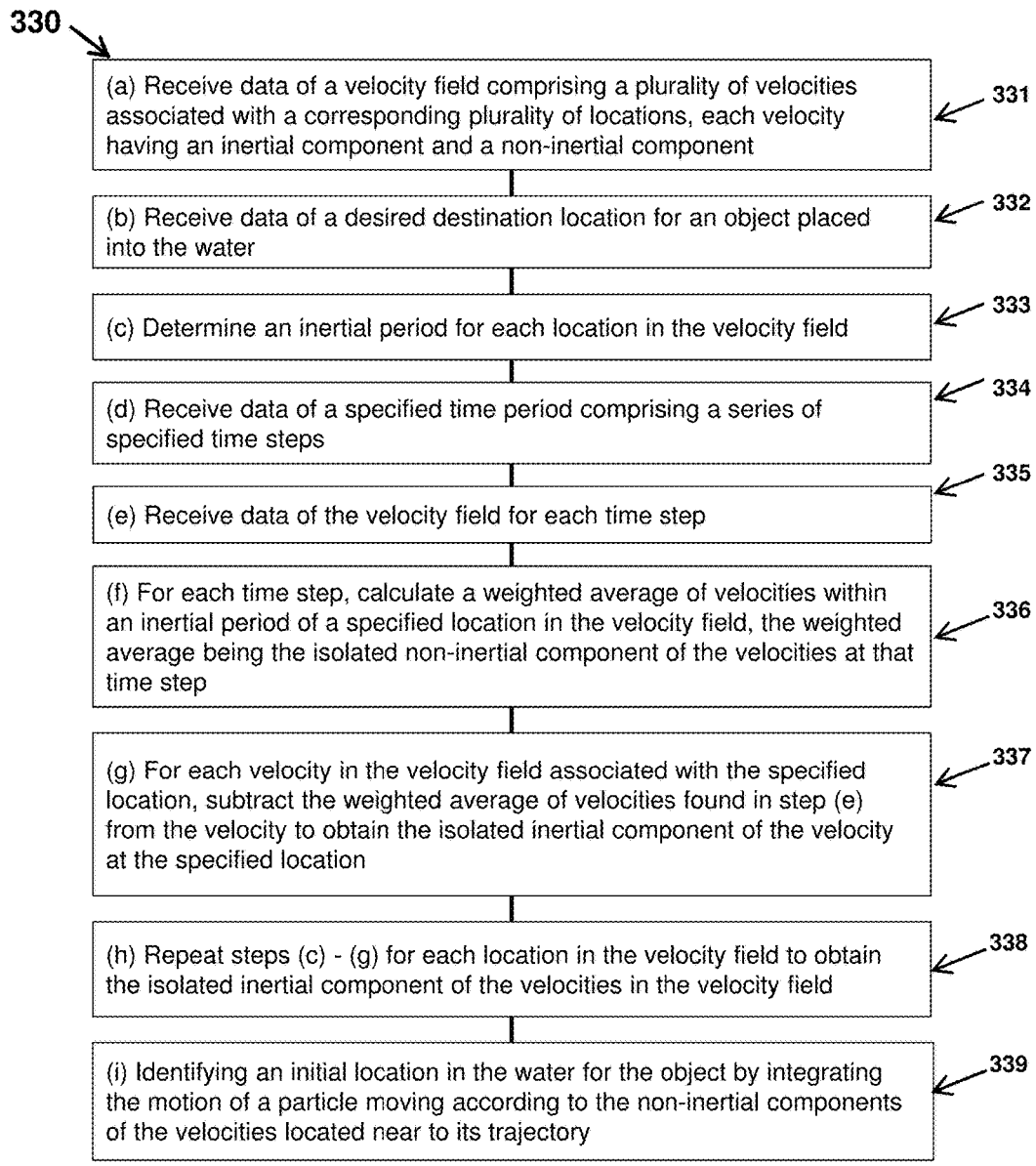

FIGS. 3A, 3B, and 3C are flow charts illustrating exemplary steps for a computer-implemented method for isolating the inertial and non-inertial components of velocities in a velocity field, as well as methods for predicting the path of an instrument in the ocean and for positioning an item in the ocean using the isolated inertial and non-inertial velocities found using the method of the present invention, where the methods described herein are implemented using one or more computers programmed with software that enables the computer(s) to perform the steps of the methods described herein.

FIG. 3A is a flow chart illustrating exemplary method steps in a computer-implemented method 310 for isolating an inertial oscillation component of a velocity field in a geographic area of a body of water in accordance with one or more aspects of the present invention.

As shown in FIG. 3A, the method for isolating an inertial oscillation component of a velocity field begins at step 311 with a computer receiving data of a velocity field in a geographic area of interest in a large body of water such as an ocean or a large lake. A velocity field is comprised of a two-dimensional collection of direction and flow in a vector quantity that can be equivalently represented as north-south and east-west components. The velocity field data includes data of a plurality of velocities in a geographic area of interest over a period of time and further includes data of a corresponding plurality of locations associated with each velocity, the location data comprising data of their latitude and longitude in the geographic area.

The velocity at any given location comprises an inertial component corresponding to an inertial oscillation of the body of water at that location as well as a non-inertial component corresponding to all remaining flow contributions. As described above, the inertial oscillation component varies over a period that is a function of the latitude of the velocity's location, and can be viewed as reflecting the inherent horizontal oscillation mode of the water's velocity due to the rotation of the earth at that latitude.

At step 312 of the method, the computer determines an inertial period for each location in the velocity field, i.e., the period of the inertial oscillation at each location. The inertial period is a function of the location's latitude and is given by the relation $$\frac{11.97 \text{ hours}}{\text{Sine of the latitude}}.$$

A location's latitude ranges from 0° to 90° North or South, depending on which hemisphere. The inertial period is longer at locations closer to the Equator (latitude of 0°), and gets shorter as the location moves closer to the North or South Pole. Thus, for example, as illustrated in the FIGURES herein, the inertial period at a latitude of 20° S, i.e., 20 degrees south of the Equator, is 35 hours; at a latitude of 30° S is 23.94 hours; at 40° S is 18.62 hours; and at 50° south of the Equator, the inertial period is 15.63 hours.

At step 313, the computer then receives a specification of the time period over which the velocity field is to be analyzed, the specified time period comprising a series of specified time steps. For example, in the FIGURES herein, the specified time period is four days, with three-hour time steps. However, any other suitable time period and set of time steps can be used, with the time steps being equal or unequal over the specified time period.

At the next step 314, the computer receives data of the velocity field for each time step, the data including data of the plurality of locations and updated velocities at each such location.

At steps 315 through 317, the computer filters the velocity field data to isolate the inertial and non-inertial components of the velocity field.

The filtering begins at step 315, in which the computer calculates a weighted average of the velocities at each time step over a corresponding inertial period for a specified location in the velocity field. Each velocity value has a corresponding time and location. In the examples in the FIGURES, each velocity represents a 3-hour window distributed evenly around its center time, so the full weight of each value is three hours. For example, the hour 03:00 velocity represents conditions from 01:30 to 04:30. The hour 00:00 velocity represent conditions starting at 22:30 on the prior day and extending until 01:30 of the present day. The velocity value at a particular location is sampled at different times. For purpose of the filter, we assume that the velocity sampled at a location is representative of the velocity for a specific interval of time, starting halfway between the present and prior values and ending halfway between the present and subsequent values. Typically, this time is a constant period between regular observation samples or samples of the numerical model. We indicate this time value as the full weight.

The weighted average of the velocities at a particular location and filter time is computed by comparing the inertial period at that location with the specific times in the time series, the term "time series" being used to refer to the time period over which the velocity data is to be analyzed. In the multi-day time axis shown in the FIGURES, e.g., FIGS. 5A-5H herein, earlier times are to the left and later times are to the right, and so in the description herein, we will refer to relative times of the velocity samples or ends of the filter window using left to indicate earlier times and right to indicate later times. The time at which the filter is applied is the filter time and is shown within the light gray box in the FIGURES; an application of the filter at the filter time may average over velocities from different times within the filter window.

The first step in computing the weighted average is to determine whether the time filter of length equal to the inertial period is longer than the duration of the time series for the velocity data. If so, then the weighted average uses all of the data at that location with equal weight, summing the observations and dividing by the number of observations. If the inertial period is shorter than the length of the time series, then the filter is skewed to the past, time centered, or skewed to the future. If half of the inertial period is less than the difference between the start of the time series and the filtering time, then the filter is skewed to the future or skewed late. If half of the inertial period is less than the difference between the end of the time series and the filtering time, then the filter is skewed to the past or skewed early. Otherwise, the time filtering window is time centered.

The next step in computing the weighted average is to determine the start and end times of the velocity filter. If the filter is skewed late, the left end of the filter is one-half of the velocity sampling interval before the time of the first velocity value in the time series. The right end of the filter falls one inertial period later. If the filter is skewed early, the right end of the filter is one-half of the velocity sampling interval after the time of the last velocity value in the time series. The left end of the filter falls one inertial period earlier. If the filter is centered, then the endpoints are one-half inertial period before and after the filter time.

The next step in computing the weighted averages is to determine which velocity data fall wholly or partially within the filter time window. Each velocity value wholly in the filter window receives its full weight as defined above, 3 hours in the example in the figures. The first and last velocity fields in the window may be only partially included, and for a short inertial period may be the same velocity field. The weight of each partial field is the time interval during which it is included within the filter time window.

The weighted average of the velocity fields within a filter window is the sum of the velocities in each full window times the full weight plus the sum of each partially-included velocity times its partial weight, all divided by the inertial period. The weighted average calculated at each time step comprises the isolated non-inertial component of the velocity field at that location and that time step. By repeating steps 312-315 for the velocities associated with each location in the velocity field, the isolated non-inertial components of the entire velocity field is obtained. If only isolation of the non-inertial component of the velocity field at a specific location is desired, the process can end with this step.

If, on the other hand, isolation of the inertial component of the velocity field is also desired, the process can continue, and at step 316, the computer subtracts the weighted average of velocities found in step 315 from each velocity in the velocity field associated with the specified location used in steps 312 through 315 to obtain the isolated inertial component of the velocity at that specified location, and at step 317 repeats steps 312-316 for the velocities associated with each location in the velocity field to obtain the isolated non-inertial and inertial components of the entire velocity field.

In another embodiment, the present invention provides a computer-implemented method for predicting the path of an object in a body of water by analyzing the inertial and non-inertial components of a velocity field in a geographic area of interest.

FIG. 3B is a flow chart illustrating exemplary steps in such a method.

As shown in FIG. 3B, as with the method described above with respect to FIG. 3A, a method 320 for predicting the path of an object in a body of water in accordance with the present invention begins at step 321 with a computer receiving data of a velocity field in a geographic area of interest in a large body of water, where the velocity field and velocity field data is as described above with respect to FIG. 3A.

At step 322, the computer determines an inertial period for each location in the velocity field, i.e., the period of the inertial oscillation at each location. As noted above, the inertial period is longer at locations closer to the Equator (latitude of 0°), and gets shorter as the location moves closer to the North or South Pole, so that the inertial period at a latitude of 20° S, i.e., 20 degrees south of the Equator, is 35 hours while at 50° south of the Equator, the inertial period is 15.63 hours.

At step 323, the computer then receives data of the specification of a time period over which the velocity field is to be analyzed as described above with respect to FIG. 3A, where the specified time period comprises a series of time steps, e.g., a period of four days with three-hour time steps as described above with respect to FIG. 3A and the other FIGURES herein.

At the next step 324, the computer receives data of the velocity field for each time step, the data including data of the plurality of locations and updated velocities at each such location.

At steps 325 through 327, in the manner described above with respect to steps 315 through 317 of FIG. 3A, the computer filters the velocity field data to isolate the inertial and non-inertial components of the velocity field by calculating the weighted average of the velocities at each location.

Thus, at step 325, the computer calculates a weighted average of the velocities at each time step over a corresponding inertial period for a specified location in the velocity field in a manner as described above with respect to FIG. 3A.

The weighted average calculated at each time step comprises the isolated non-inertial component of the velocity field at that location and that time step. Because location of the object in the body of water may require information regarding both the non-inertial and the inertial components of velocities in the geographic area of interest, at step 326, the computer subtracts the weighted average of velocities found in step 325 from each velocity in the velocity field associated with the specified location used in steps 322 through 325 to obtain the isolated inertial oscillations component of the velocity at that specified location, and at step 327, steps 322 through 326 are repeated for the velocities associated with each location in the velocity field to obtain the isolated non-inertial and inertial components of the entire velocity field.

Finally, at step 328, the computer predicts the path of the object in the body of water in the geographic area of interest by integrating the motion of a particle moving according to the non-inertial components of the velocities in the locations in the velocity field near to its trajectory. An example of the trajectory calculation can be found in C. N. Barron, L. F. Smedstad, J. M. Dastugue, and O. M. Smedstad, *Evaluation of ocean models using observed and simulated drifter trajectories: Impact of sea surface height on synthetic profiles for data assimilation*, Journal of Geophysical Research, 112, C07019, doi: 10.1029/2006JC002982, 2007, the entirety of which is incorporated by reference into the present disclosure.

In yet another embodiment, aspects of which are illustrated in the flow chart shown in FIG. 3C, the present invention provides a computer-implemented method 330 for determining where to place an object in a body of water so that it travels to a desired location by analyzing the inertial and non-inertial components of a velocity field in a geographic area of interest.

This embodiment of the present invention includes the steps described above to isolate the inertial and non-inertial components of the velocities in the velocity field. Thus, in method 330 illustrated in FIG. 3C, the method for determining where to place an object in a body of water so that it reaches a desired location begins at step 331 with a computer receiving data of a velocity field in a geographic area of interest in a large body of water, where the velocity field and the velocity field data are as described above with respect to FIG. 3A.

At step 332, the computer receives data of the desired destination location of the object, with the object of the method being to determine a location in the water that will cause the object to travel to the desired destination location.

At step 333, the computer determines an inertial period for each location in the velocity field, i.e., the period of the inertial oscillation at each location. As noted above, the inertial period is longer at locations closer to the Equator (latitude of 0°), and gets shorter as the location moves closer to the North or South Pole, so that the inertial period at a latitude of 20° S, i.e., 20 degrees south of the Equator, is 35 hours while at 50° south of the Equator, the inertial period is 15.63 hours.

At step 334, the computer then receives the specification of the time period over which the velocity field is to be analyzed as described above with respect to FIGS. 3A and 3B.

At the next step 335, the computer receives data of the velocity field for each time step, the data including data of the plurality of locations and updated velocities at each such location.

At steps 336 through 338, the computer filters the velocity field data in the manner described above with respect to FIGS. 3A and 3B to isolate the inertial and non-inertial components of the velocity field by calculating the weighted average of the velocities at each time step.

Thus, at step 336, the computer calculates a weighted average of the velocities at each time step over a corresponding inertial period for a specified location in the velocity field in a manner as described above with respect to FIGS. 3A and 3B. The weighted average calculated at each time step comprises the isolated non-inertial component of the velocity field at that location and that time step.

Because determining where to place an object in a body of water so that it travels to a desired location may require information regarding both the non-inertial and the inertial components of velocities in the geographic area of interest, at step 337, the computer subtracts the weighted average of velocities found in step 336 from each velocity in the velocity field associated with the specified location to obtain the isolated inertial oscillations component of the velocity at that specified location, and at step 338, repeats steps 322 through 337 for the velocities associated with each location in the velocity field to obtain the isolated non-inertial and inertial components of the entire velocity field.

Finally, at step 339, the computer determines the location in the body of water where the object should be placed so that it reaches a desired destination by integrating the motion of a particle moving according to the non-inertial components of the velocity field locations in the velocity field near to its trajectory. See Barron, Journal of Geophysical Research, supra.

FIGS. 4, 5A-5F, 6A-6F, and 7A-7F further illustrate aspects of a system and method for isolating the inertial oscillations component and the non-inertial component of a velocities in a velocity field in accordance with the present invention.

Figure 4:
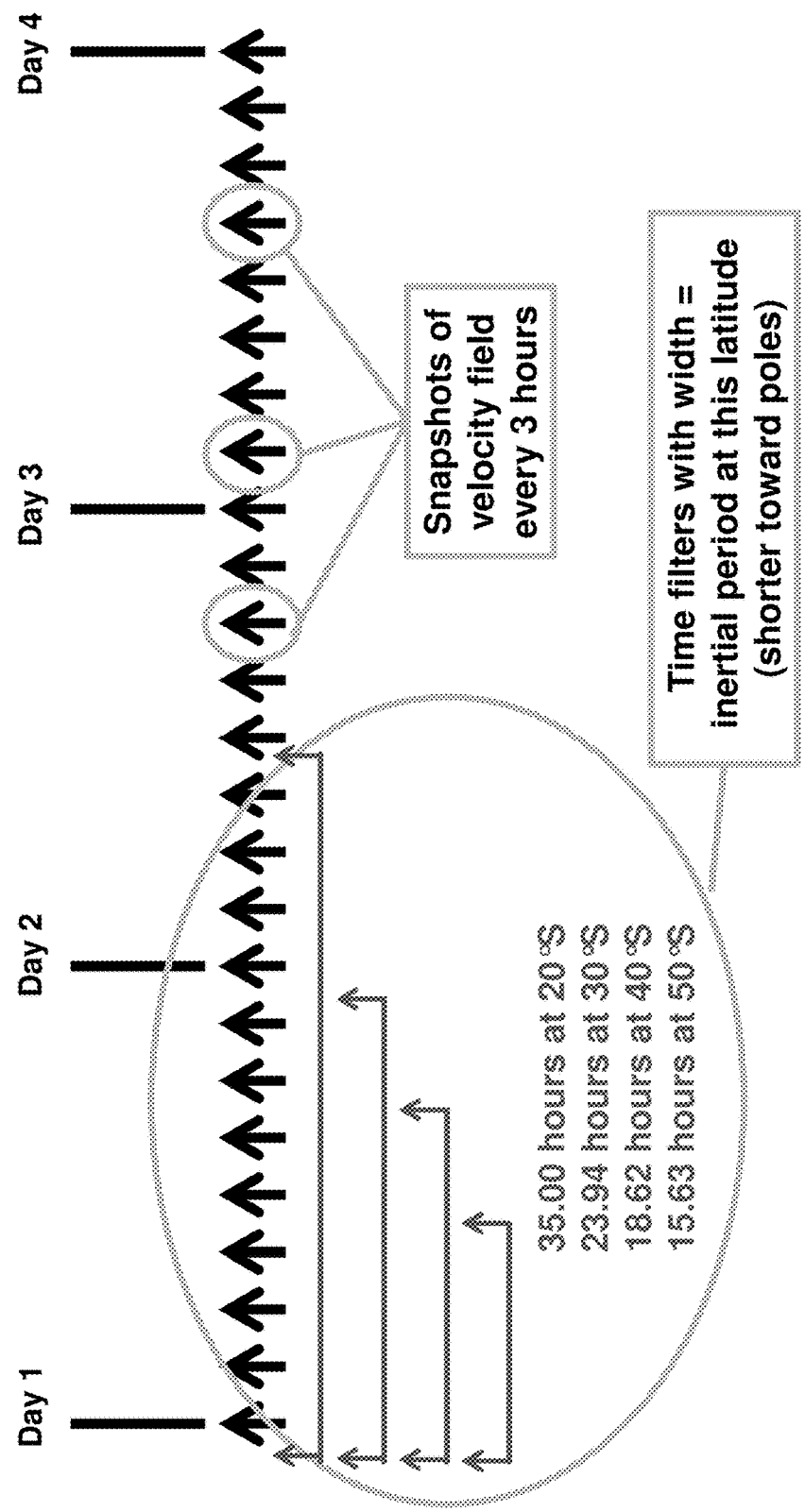
FIG. 4 is a graphical display of an exemplary initial time series of velocity fields and time filters used for isolating the inertial oscillations component and the non-inertial component of velocities in a velocity field in accordance with one or more aspects of the present invention.

FIG. 4 provides a visual representation of an exemplary velocity field which can be analyzed using a system and method in accordance with the present invention.

Figure 1B:
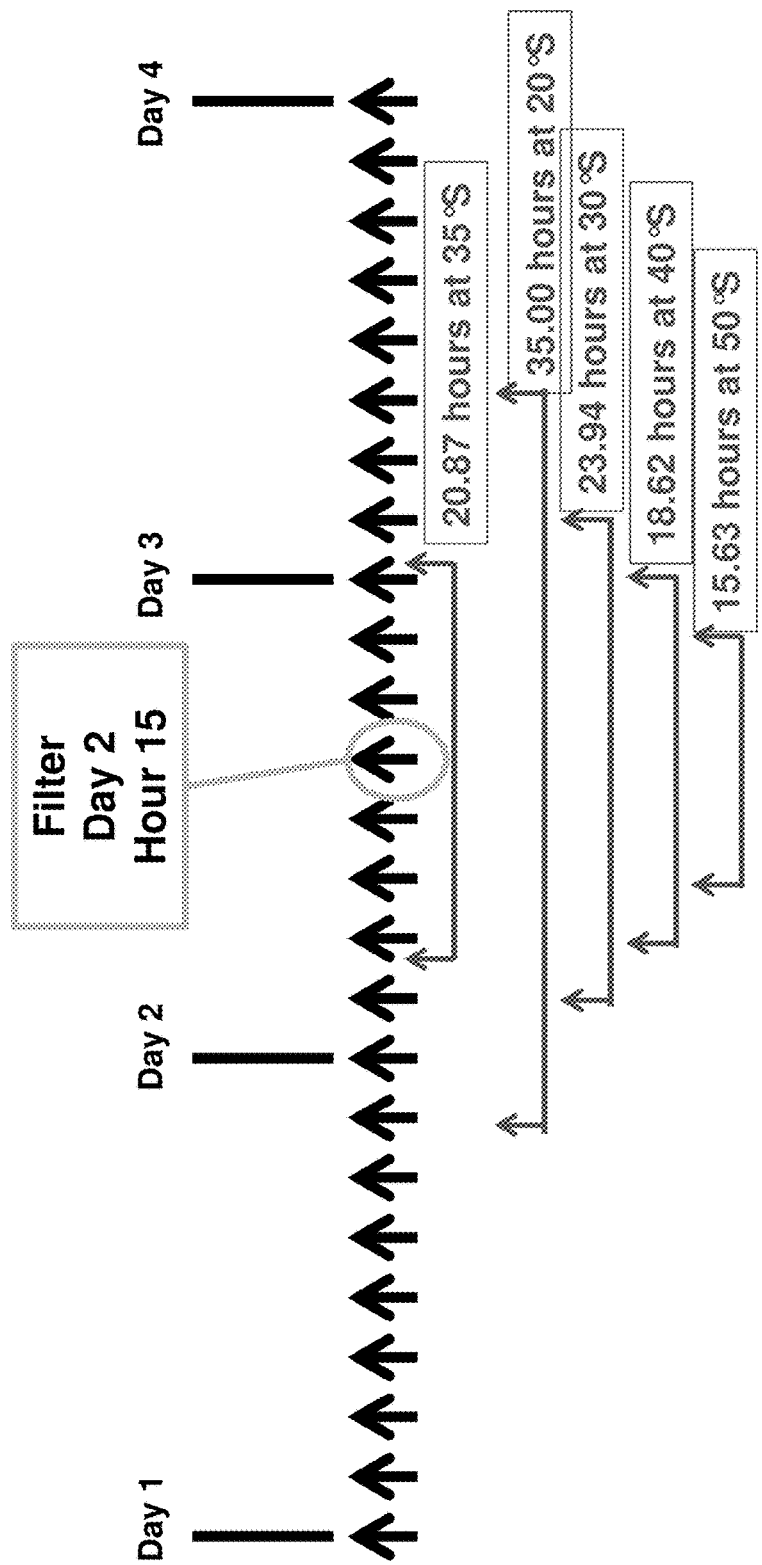
Figure 1C:
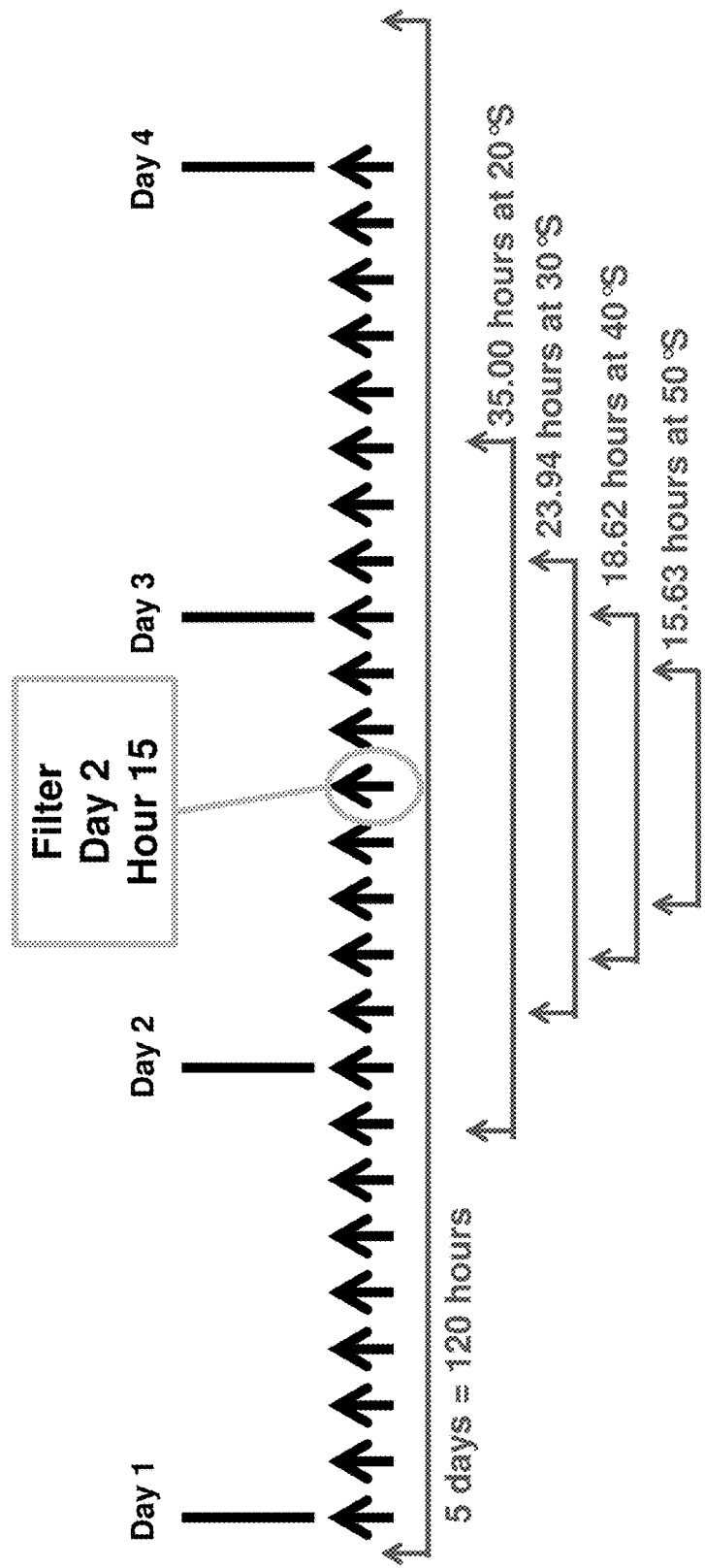

As with FIGS. 1A-1C, as shown in FIG. 4 (as well as in FIGS. 5A-5F, 6A-6F, and 7A-7F), the velocity field is represented by a series of vertical arrows, where each vertical arrow represents a reading of velocities in the velocity field at a particular point in time over a period of four days. In the representation shown in the FIGURES, the velocities are separated by three-hour intervals, though of course analysis of velocity fields using other time intervals may be made. Although all arrows have the same magnitude and direction, this is for ease of illustration only, and one skilled in the art will readily appreciate that such velocities may vary widely in magnitude and/or direction over time. In addition, as shown in FIG. 4 (and in FIGS. 5A-5F, 6A-6F, and 7A-7F, the time filters with, the velocity field is analyzed with time filters having variable widths representing the inertial oscillations period at four exemplary latitudes, 20 degrees south of the equator (20° S), 30 degrees south of the equator (30° S), 40 degrees south of the equator (40° S), and 50 degrees south of the equator (40° S), are shown. The filter widths are shorter at 50° S, (closer to the South Pole) because the period of the inertial oscillation is shorter at the poles than it is closer to the equator. Thus, as shown in the FIGURES, the time series velocities are averaged over 35 hours when the inertial oscillation at a point is computed at 20° latitude, whereas the time series velocities are averaged over 15.63 hours at 50° latitude.

FIGS. 5A-5F, 6A-6F, and 7A-7F are graphical displays illustrating the progression of time filters over a series of time steps in a method for isolating inertial and non-inertial components of a velocity field over a time series comprising four days in accordance with one or more aspects of the present invention.

Thus, as described in more detail below, FIGS. 5A-5F are graphical displays illustrating the progression of time filters over a series of time steps from the start of the velocity time series to a time less than half the maximum inertial period after the start. In these examples, one or more of the inertial windows shown are not centered over the velocity field at the central time; because the prior information does not extend sufficiently back in time, these windows are skewed toward the future. The time windows become less skewed as the time series progresses.

Figure 5A:
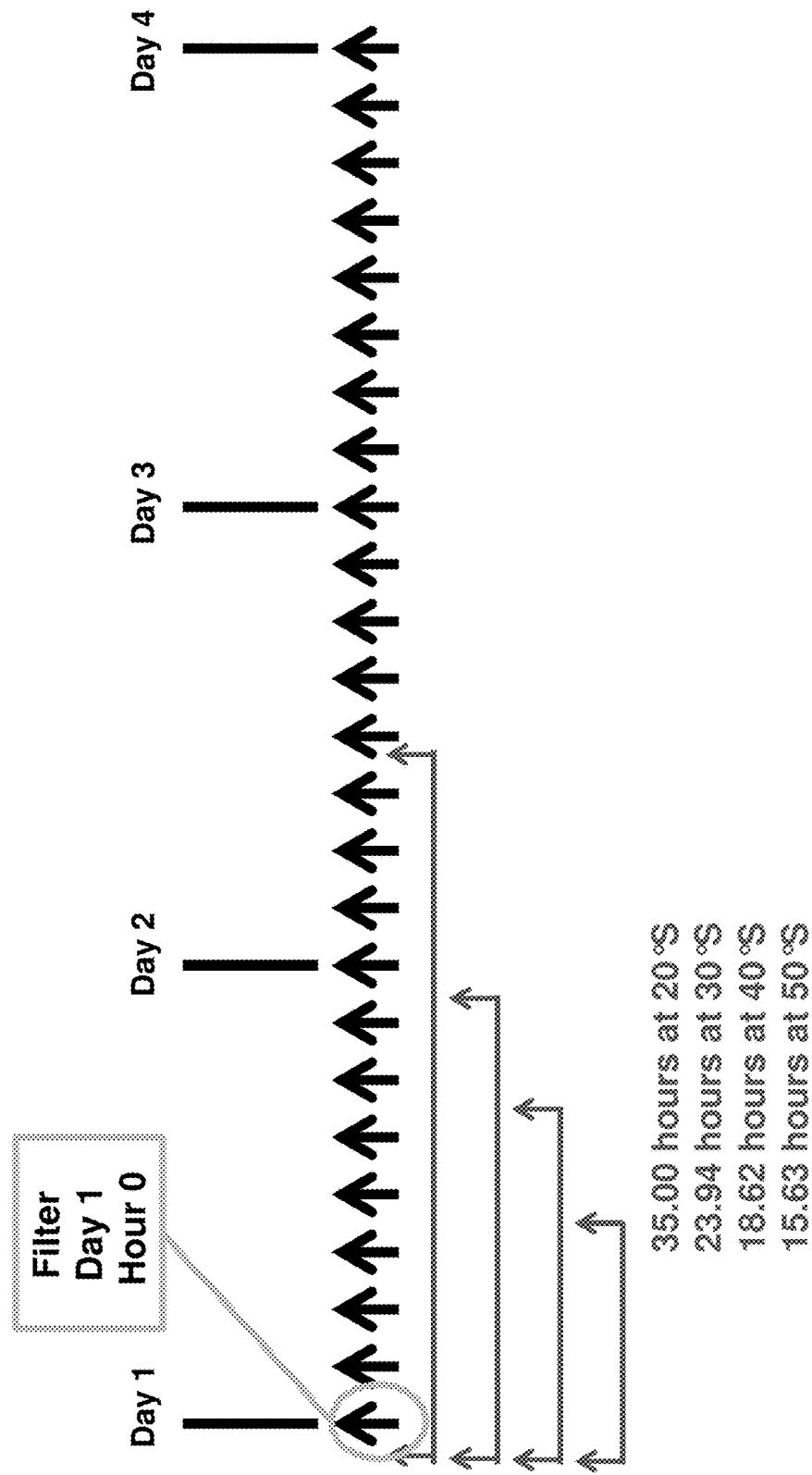

Referring now to FIG. 5A, at the start of the time series, day 1, hour 0 of the time series, although the filter width is set by the latitude, the point at which the average velocity is computed is at the beginning of the time series, thus skewing the inertial oscillation computation to the future.

Figure 5B:
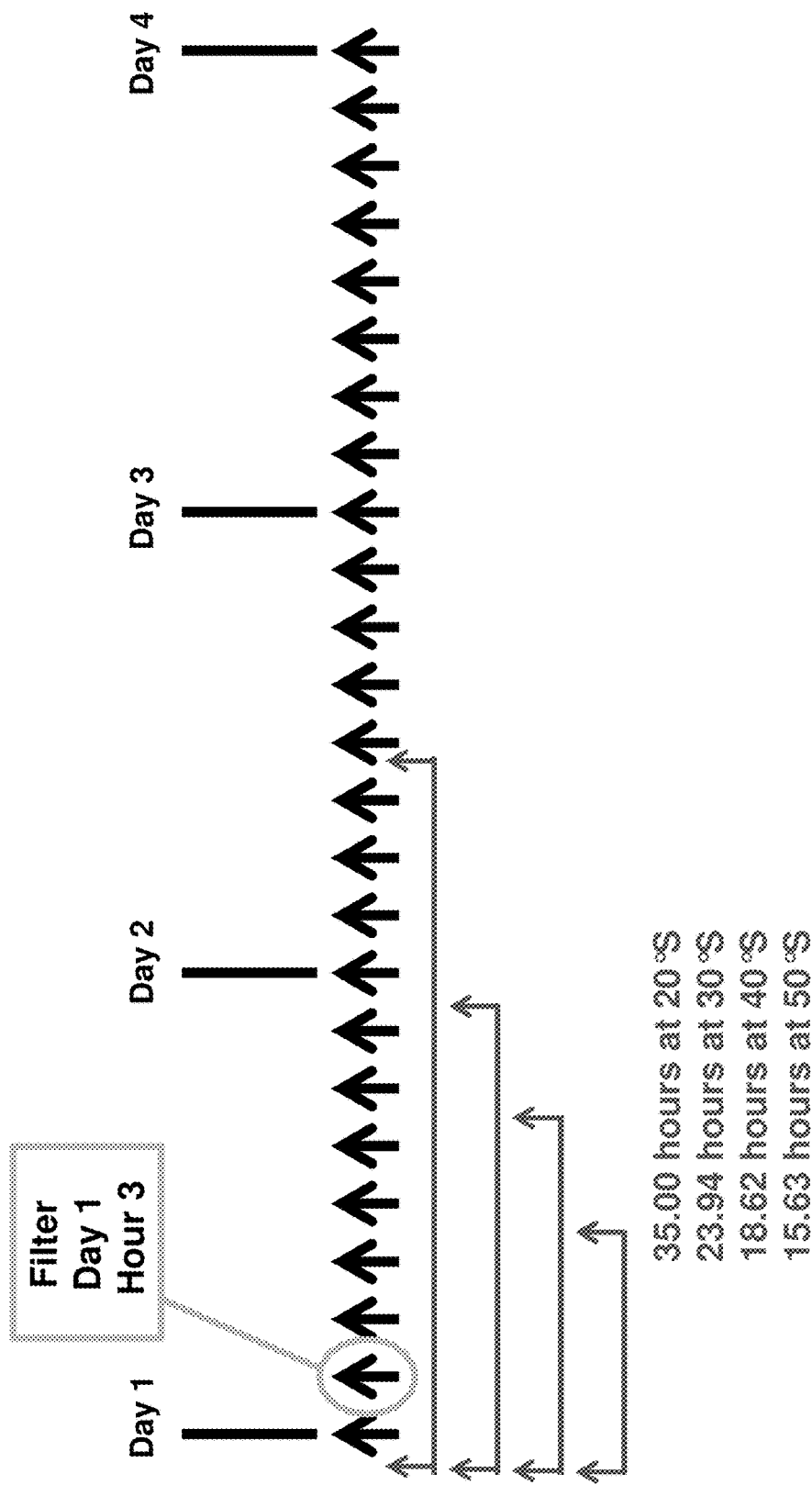

Referring now to FIG. 5B, day 1, hour 3 of the time series, the point at which the average velocity is computed is moving towards a central point in the filter, but the resulting inertial oscillation computation is skewed towards the future.

As the filtering progresses to day 1, hour 6 of the time series, as shown in FIG. 5C, the shorter filters are beginning to be centered on the point at which the inertial oscillation is computed.

Figure 5D:
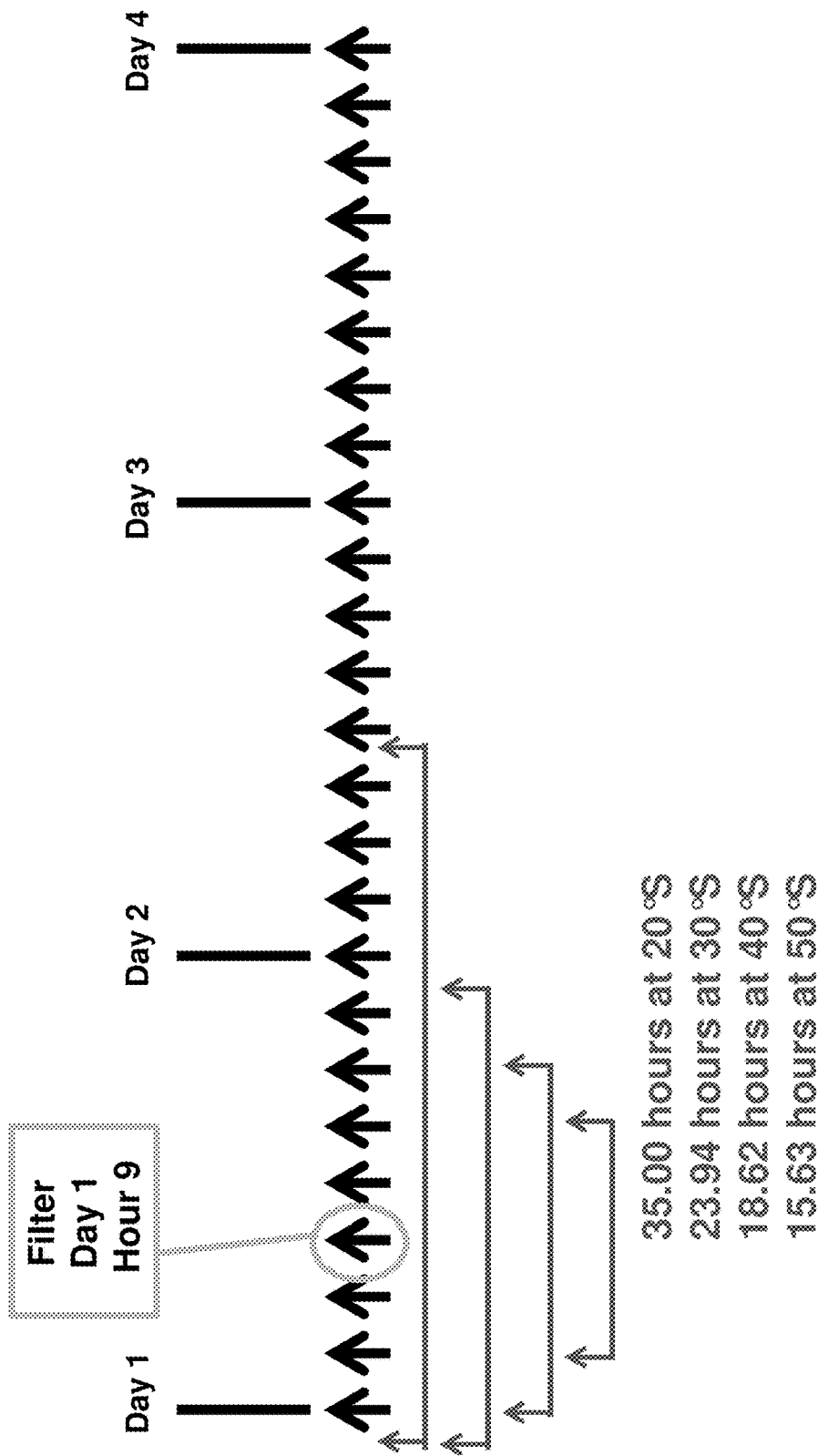
Figure 5E:
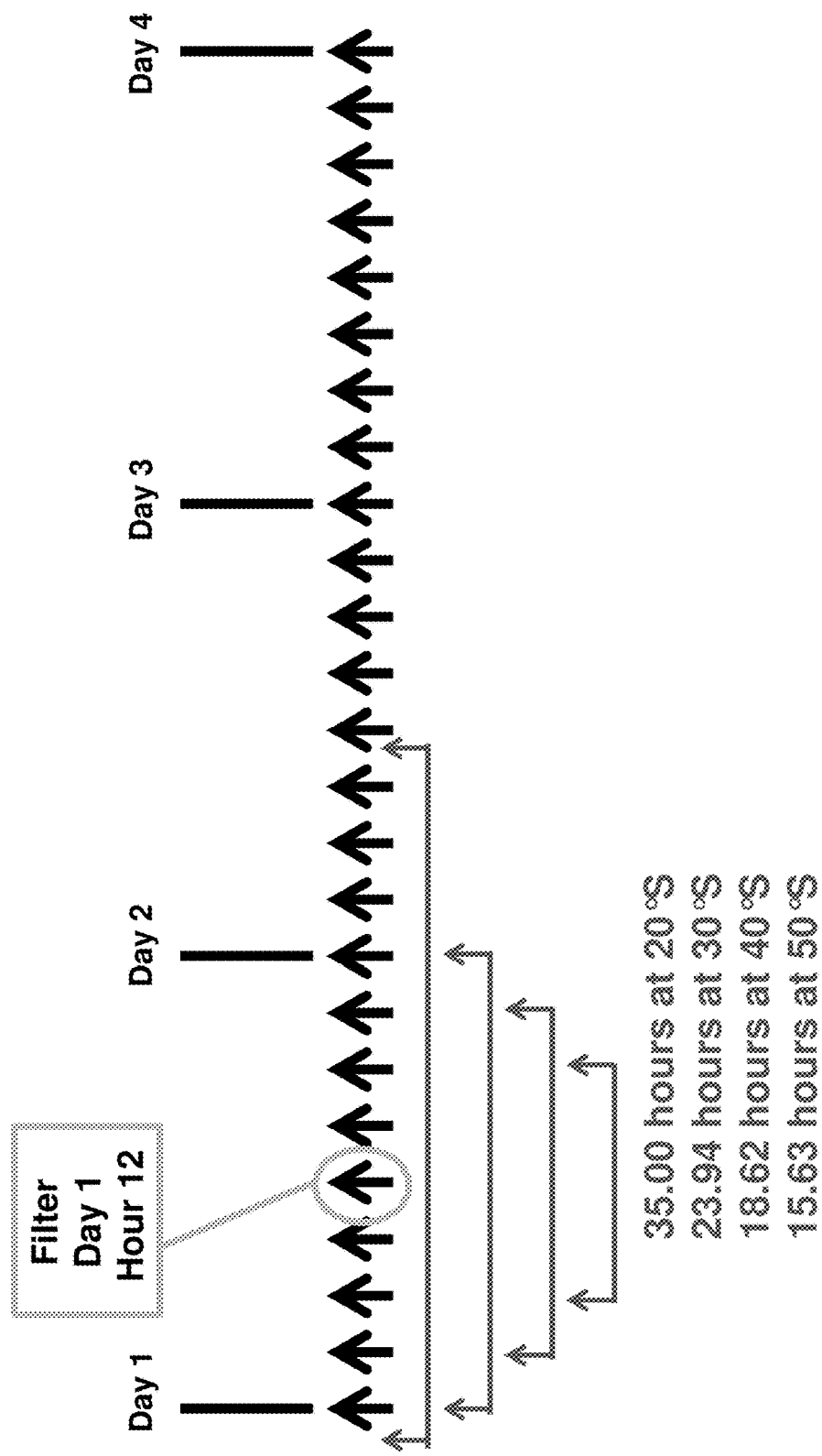
Figure 5F:
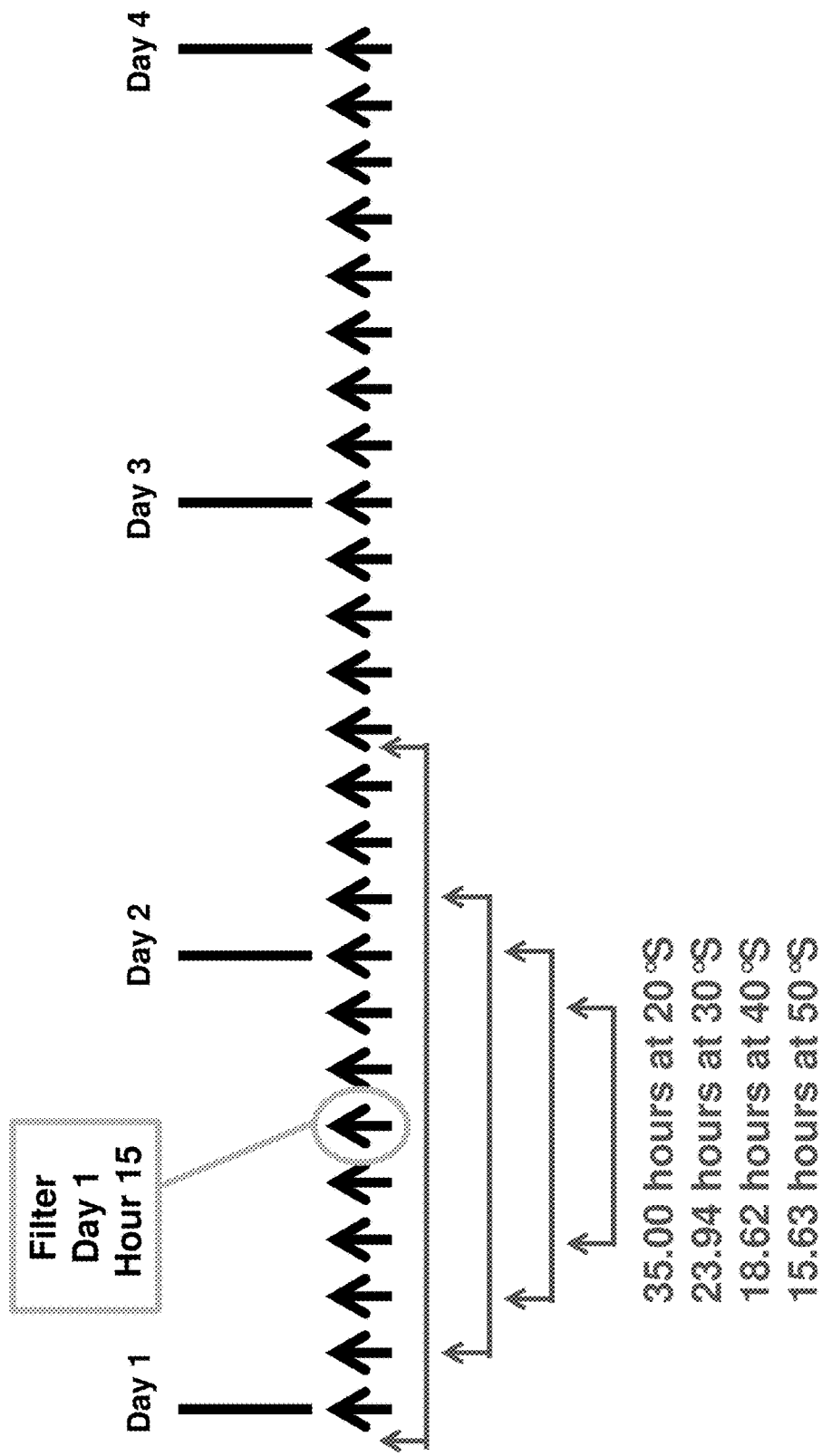

At day 1, hour 9, shown in FIG. 5D, the 50° latitude filter and the 40° latitude filter are centered; at day 1, hour 12, shown in FIG. 5E, all filters except the 20° latitude filter are centered; and at day 1, hour 15, all filters except the 20° latitude filter are centered, as shown in FIG. 5F.

FIGS. 6A-6F are graphical displays further illustrating the progression of time filters over a series of time steps in a method for isolating inertial and non-inertial components of a velocity field. These show the progression of the filter over the interior of the time series where all inertial periods under consideration are able to be time-centered as filtering of the time series progresses.

Figure 6A:
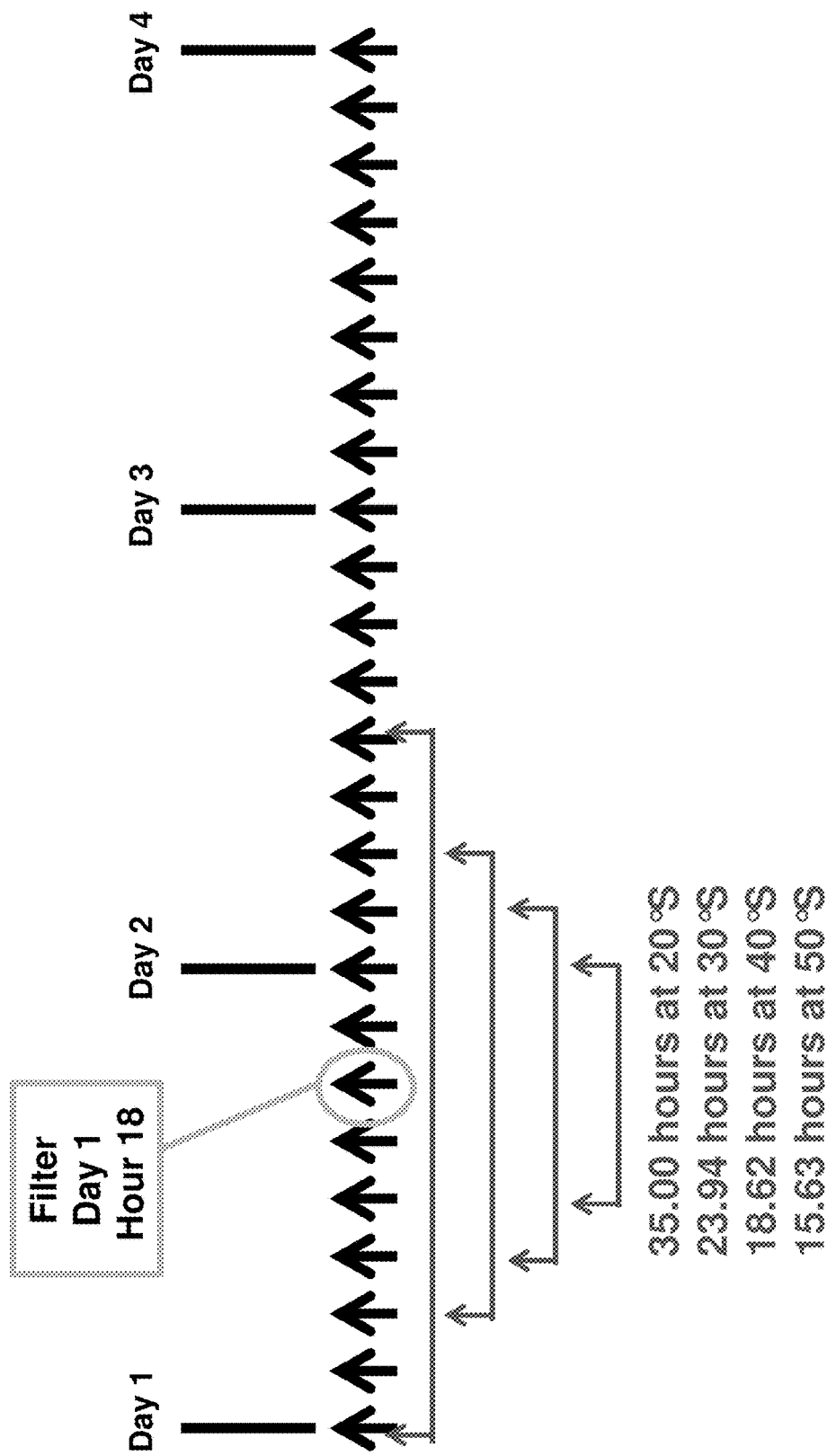
FIGS. 6A-6F are graphical displays further illustrating the progression of time filters over a series of time steps in a method for isolating inertial and non-inertial components of a velocity field.
Figure 6B:
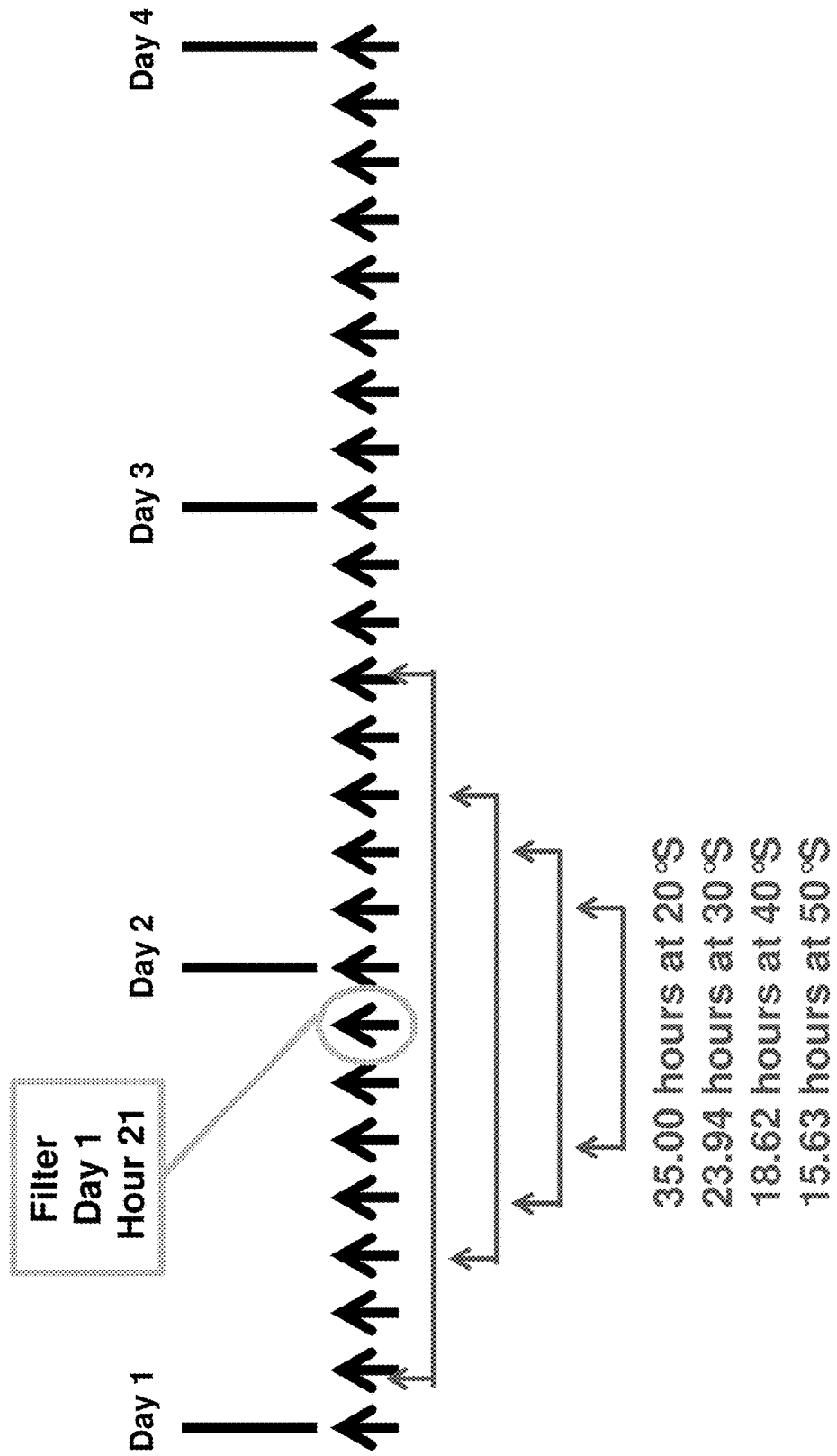
Figure 6C:
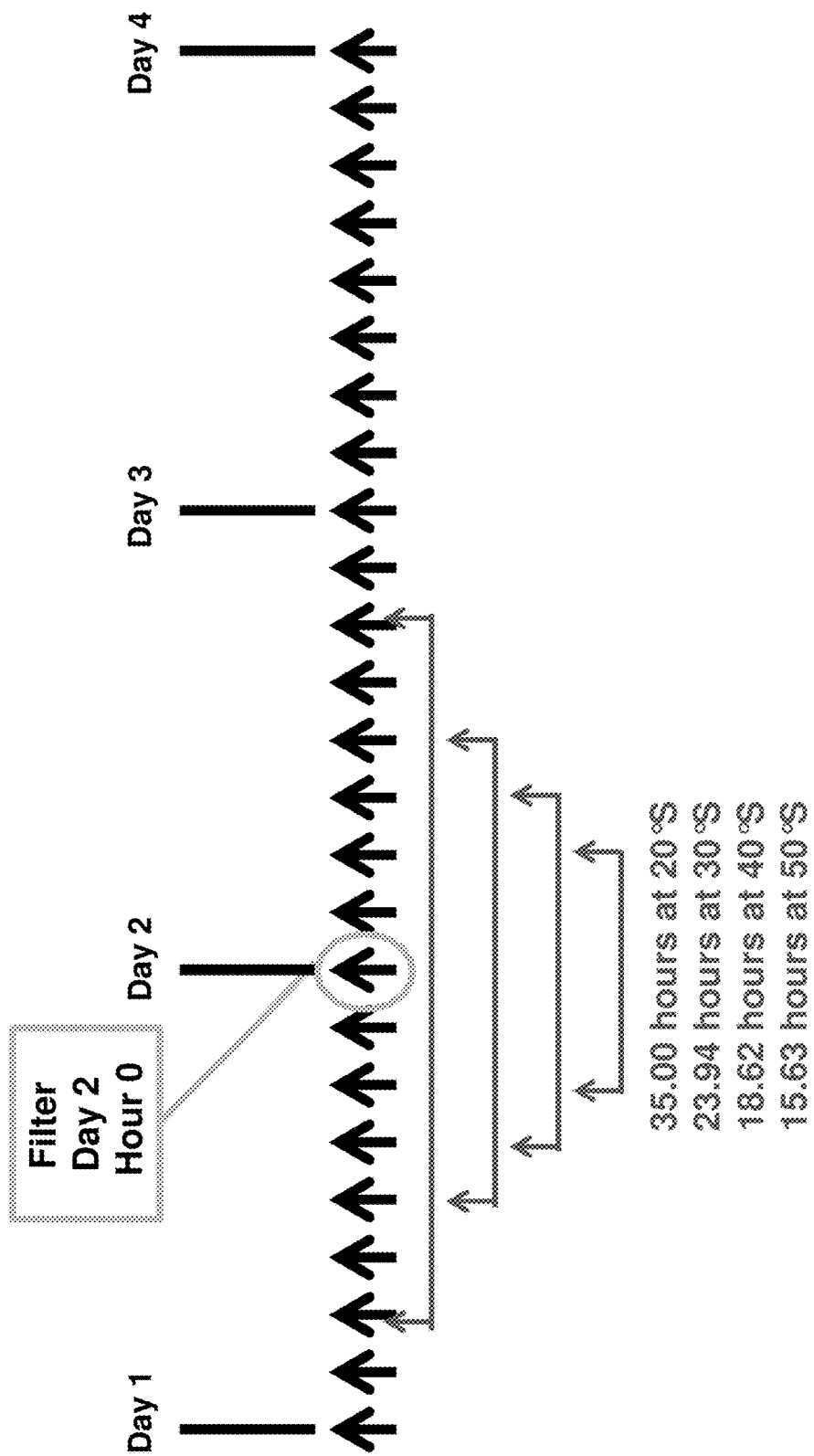
Figure 6D:
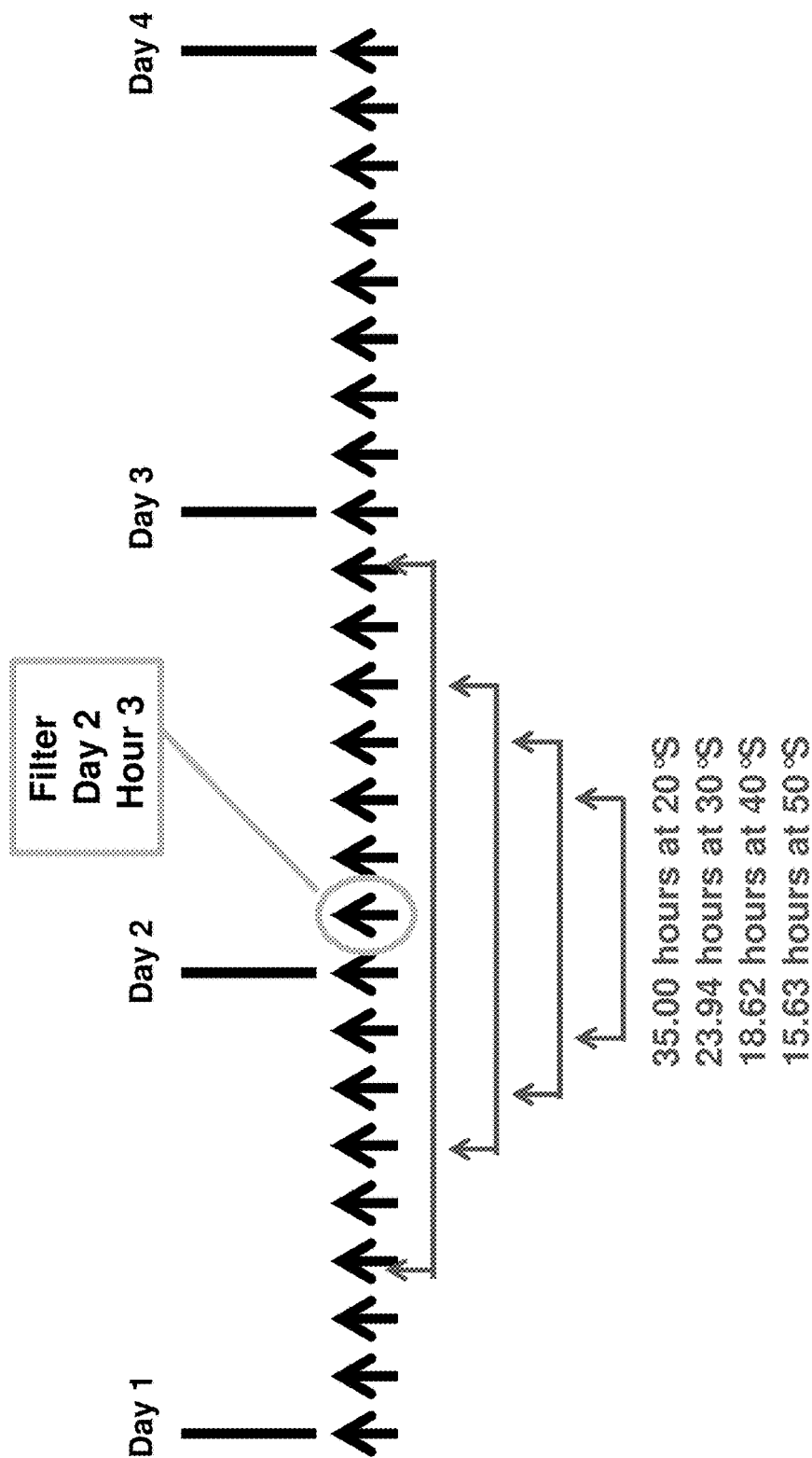
Figure 6E:
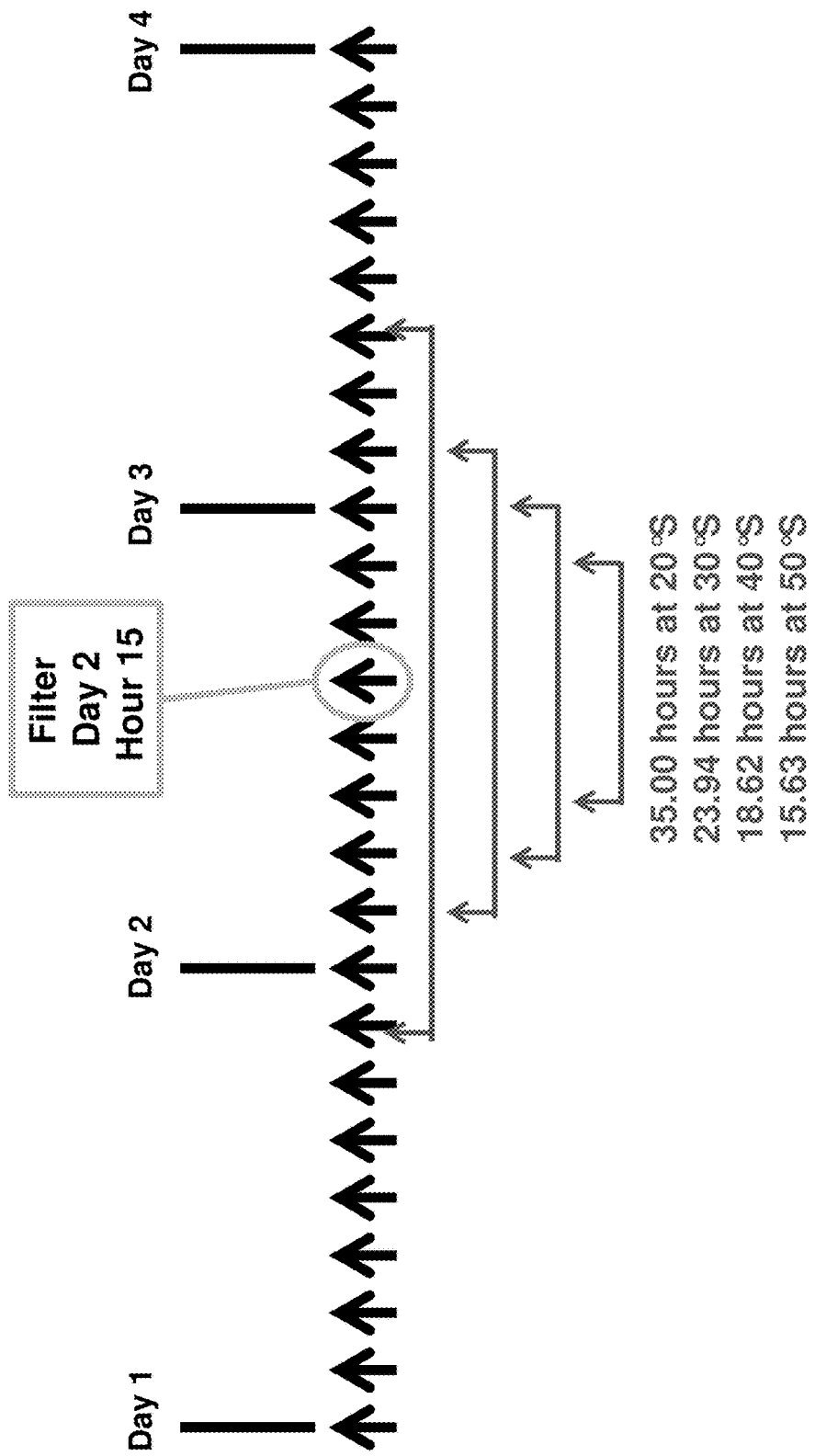
Figure 6F:
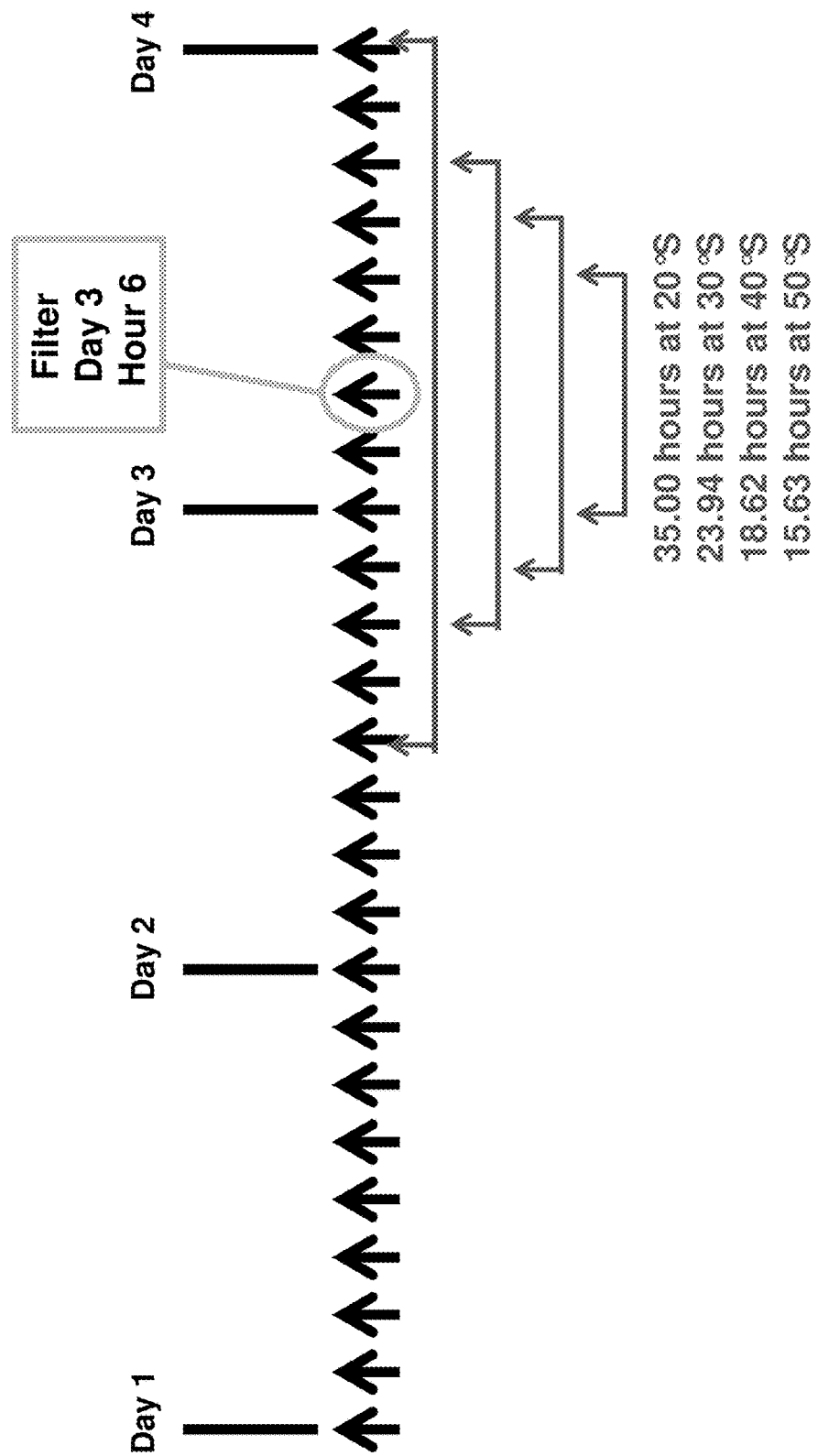

Thus, at day 1, hour 18, shown in FIG. 6A, all filters remain are centered. As the time series progresses, at day 1, hour 21 (FIG. 6B); day 2, hour 0 (FIG. 6C); day 2, hour 3 (FIG. 6D); day 2, hour 15 (FIG. 6E); and day 3, hour 6 (FIG. 6F), all filters are centered and are moving forward in the time series, following the time of the central point at which the inertial oscillation is being computed.

FIGS. 7A-7F are graphical displays further illustrating the progression of time filters over a series of time steps approaching the end of the velocity time series from a time less than half the maximum inertial period from the end. In these examples, one or more of the inertial windows shown are not centered over the velocity field at the central time; because the prior information does not extend sufficiently forward in time, these windows are skewed toward the past.

Figure 7A:
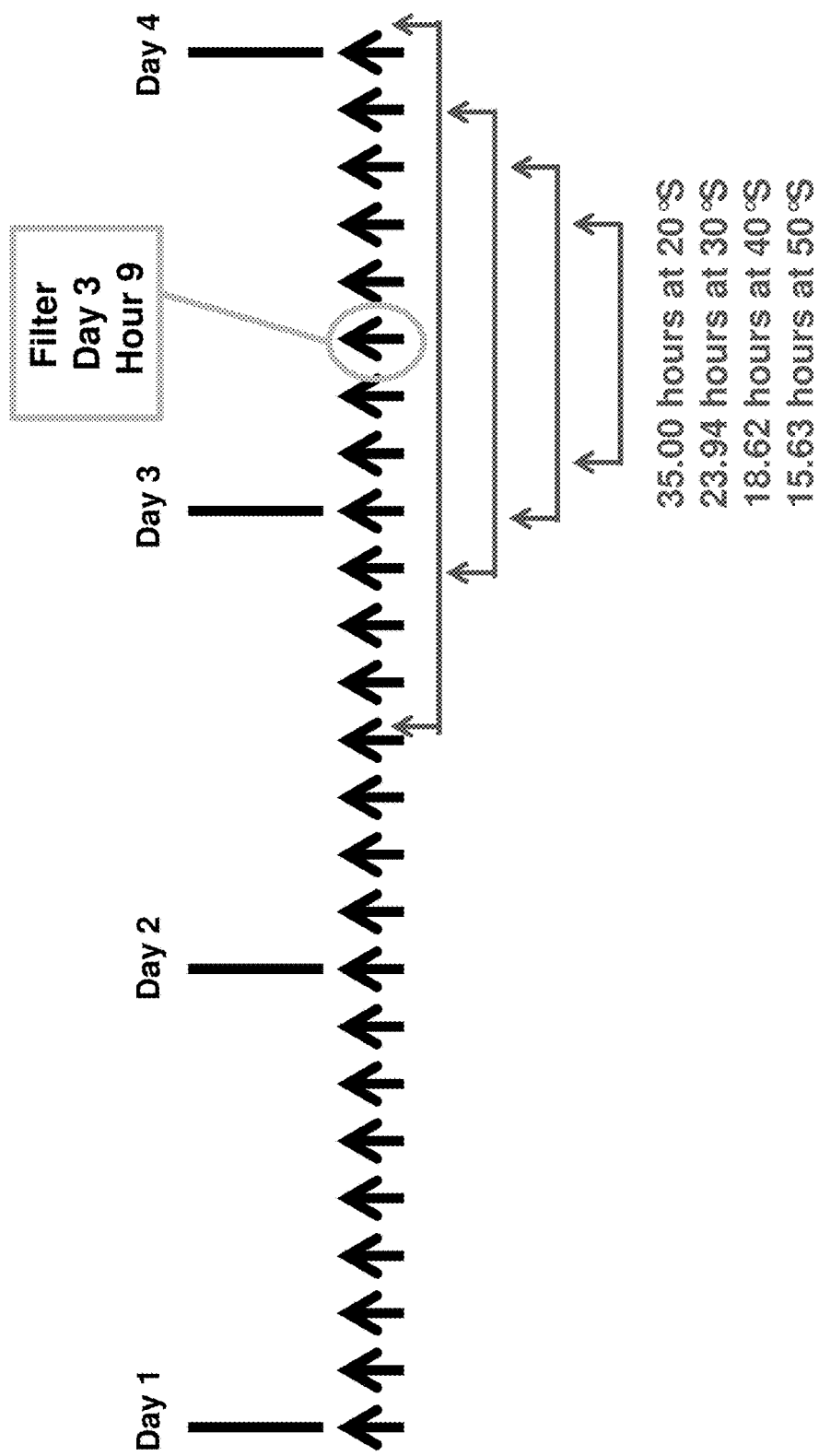
FIGS. 7A-7F are graphical displays further illustrating the progression of time filters over a series of time steps approaching the end of the velocity time series from a time less than half the maximum inertial period from the end.
Figure 7B:
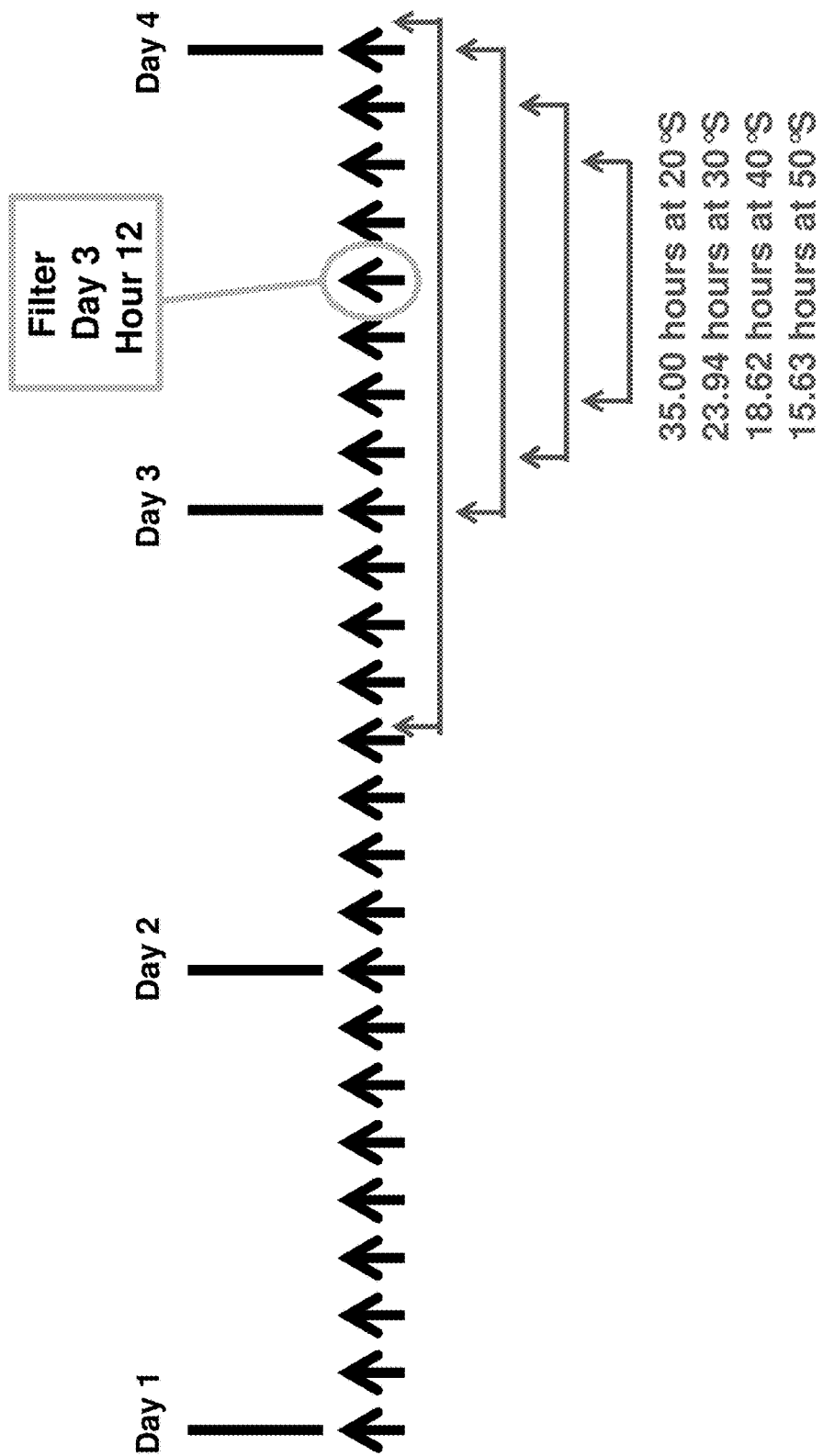
Figure 7C:
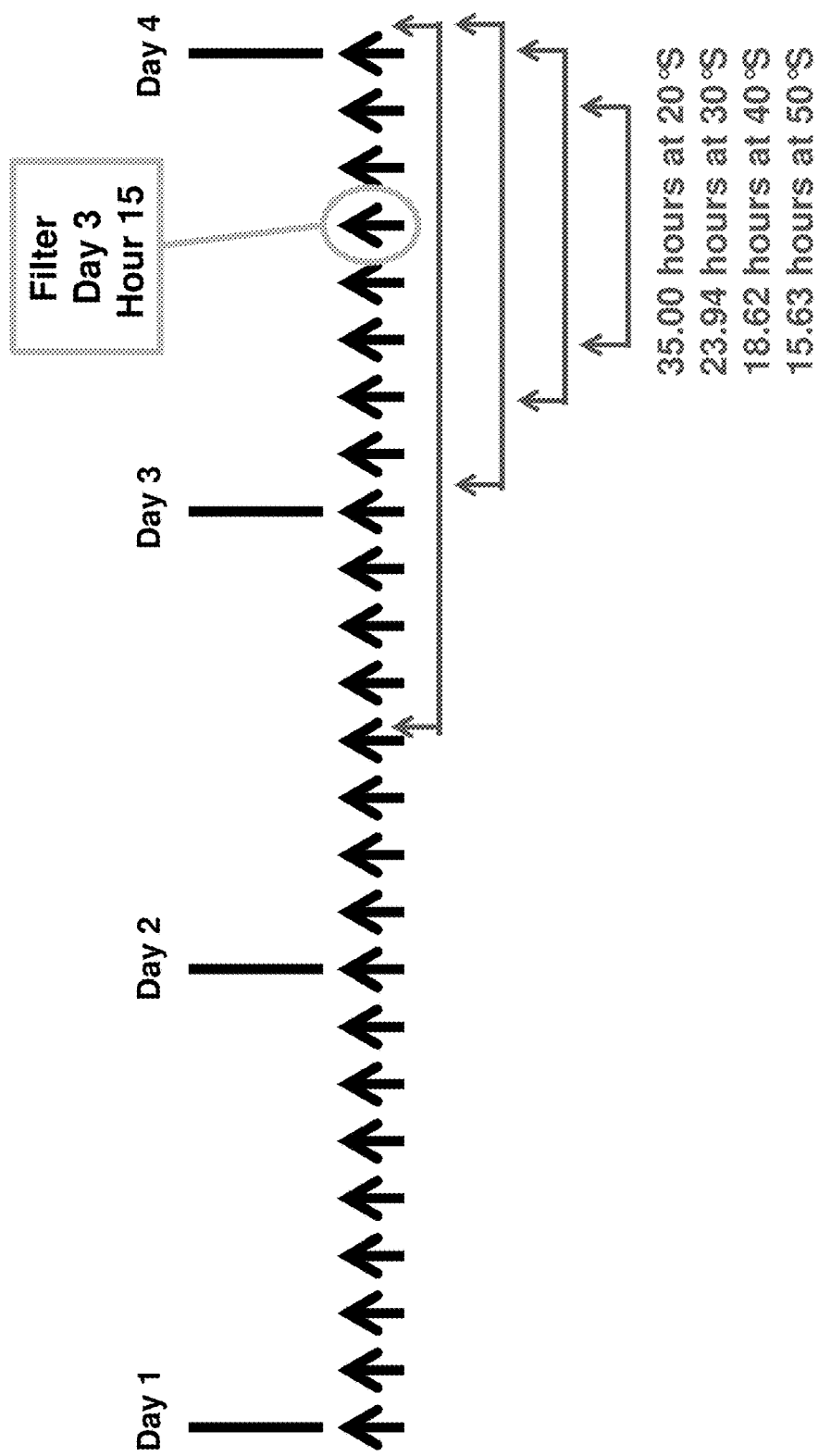
Figure 7D:
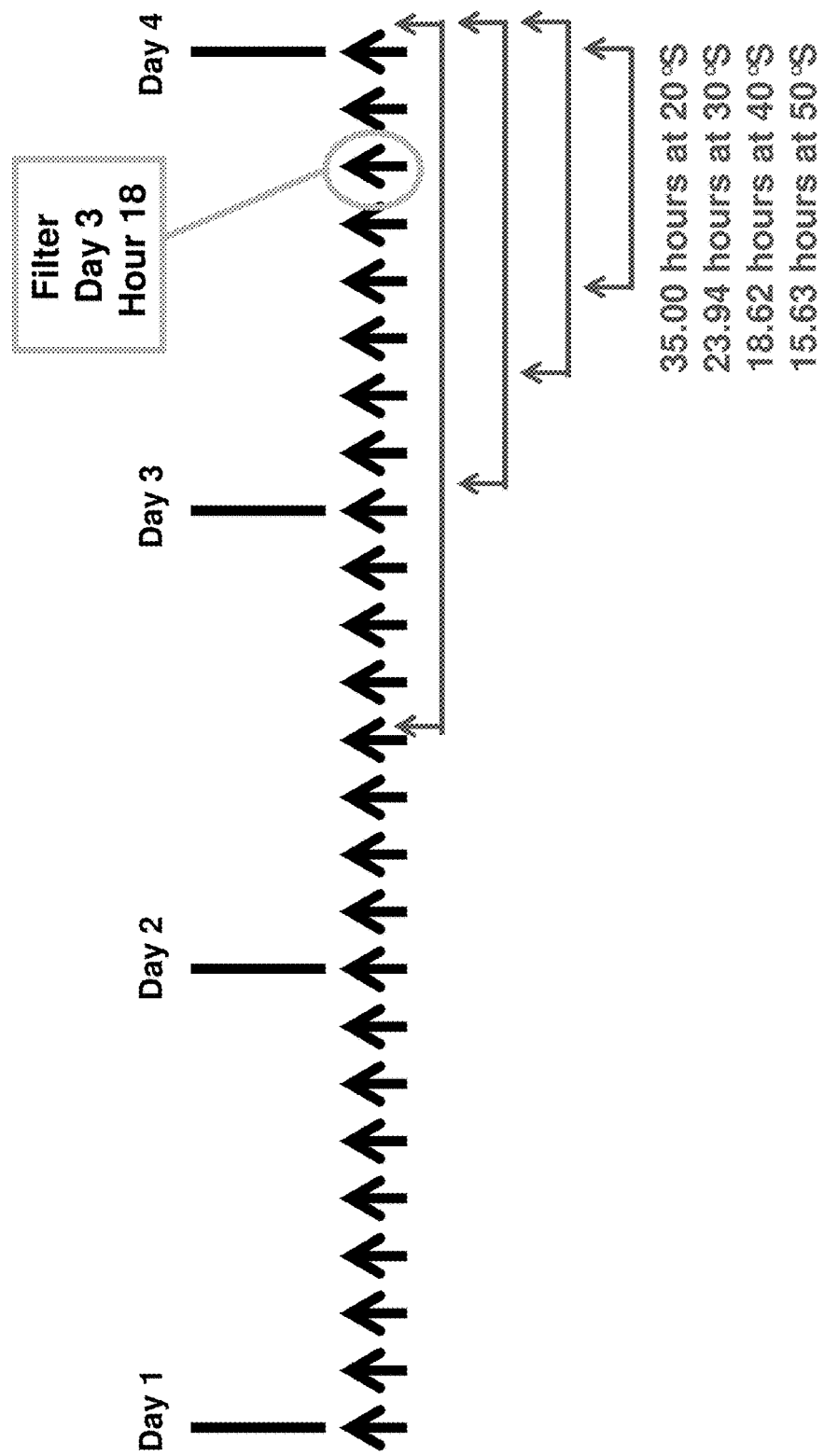
Figure 7E:
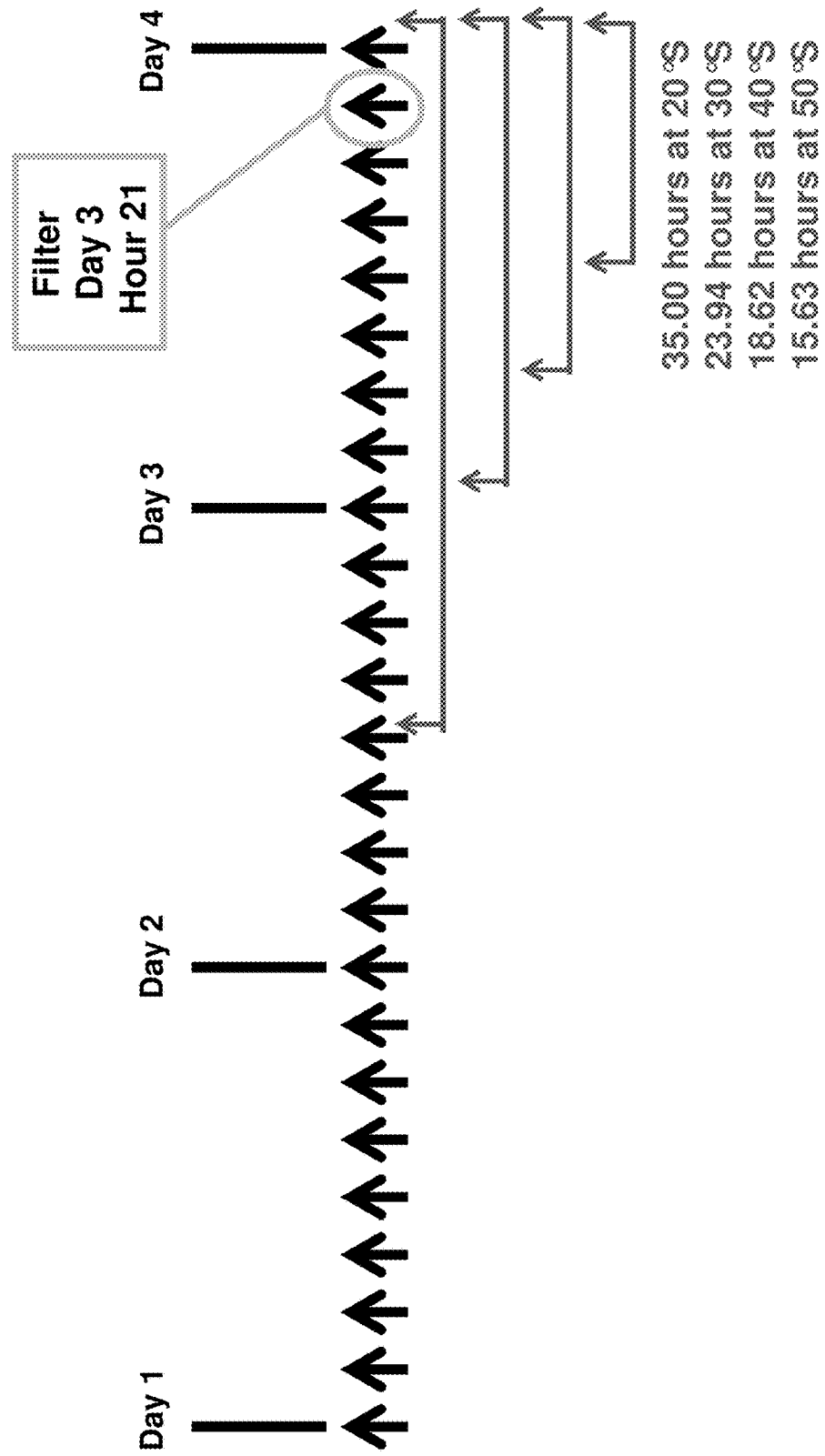

Thus, as can be seen in FIG. 7A, at day 3, hour 9, the time windows begin to skew off the center, with the 20° latitude filter being slightly skewed to the past, while the other filters remain centered. This skew of the 20° latitude time filter becomes more pronounced at day 3, hour 12 as can be seen in FIG. 7B.

Figure 7F:
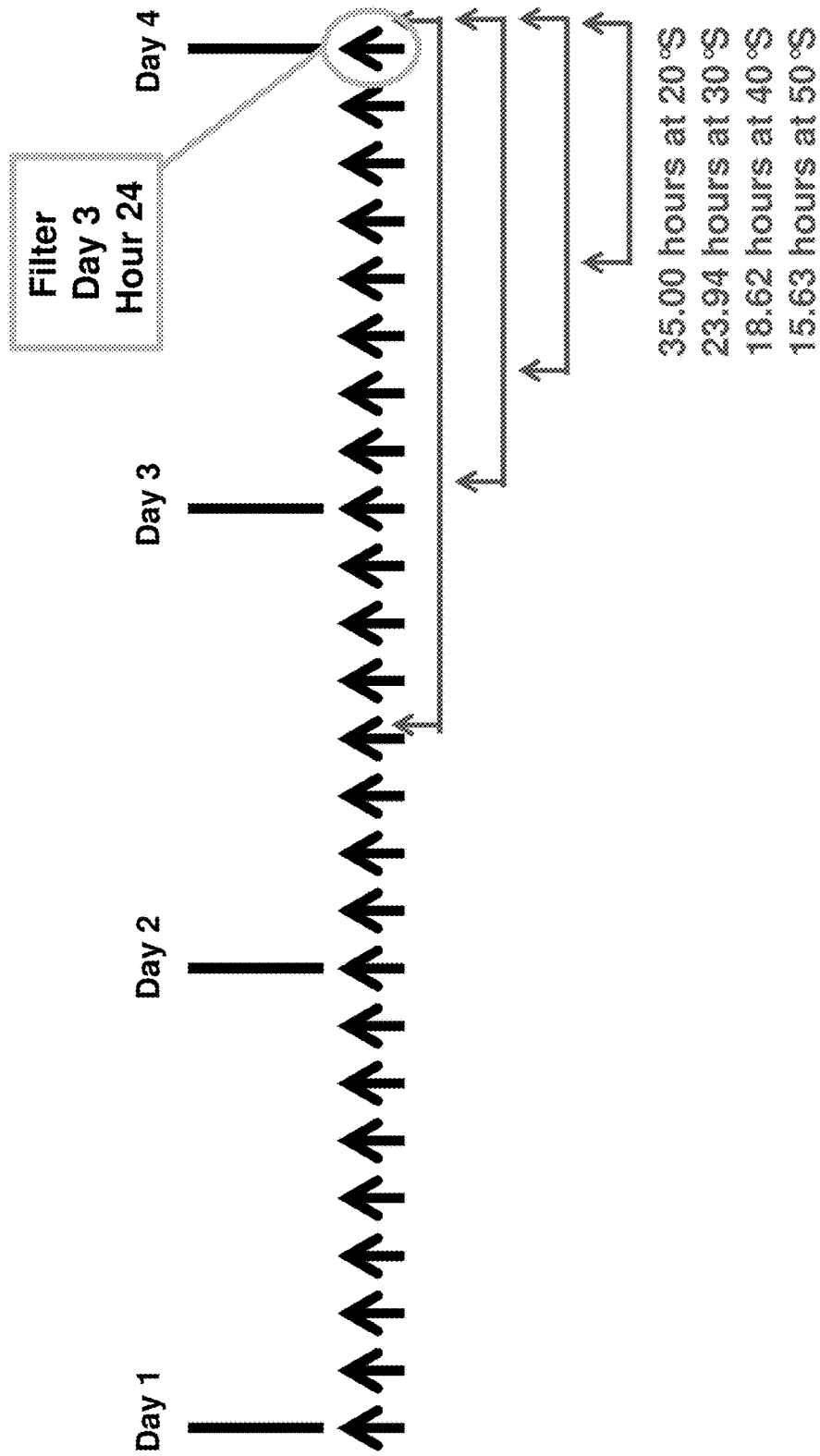

The time windows become more skewed as the time series progresses, so that at day 3, hour 15 (FIG. 7C), the 30° latitude filter begins to skew to the past, with the skew of the 20° latitude filter becoming even more pronounced. At day 3, hour 18 (FIG. 7D), the 40° latitude filter begins to skew to the past; while at day 3, hour 21 (FIG. 7E), none of the filters are centered around any time step in the time period, with even short inertial period at 50° latitude beginning to skew. Finally, as can be seen in FIG. 7F, at day 3, hour 24, all are skewed to the past.

Figure 8:
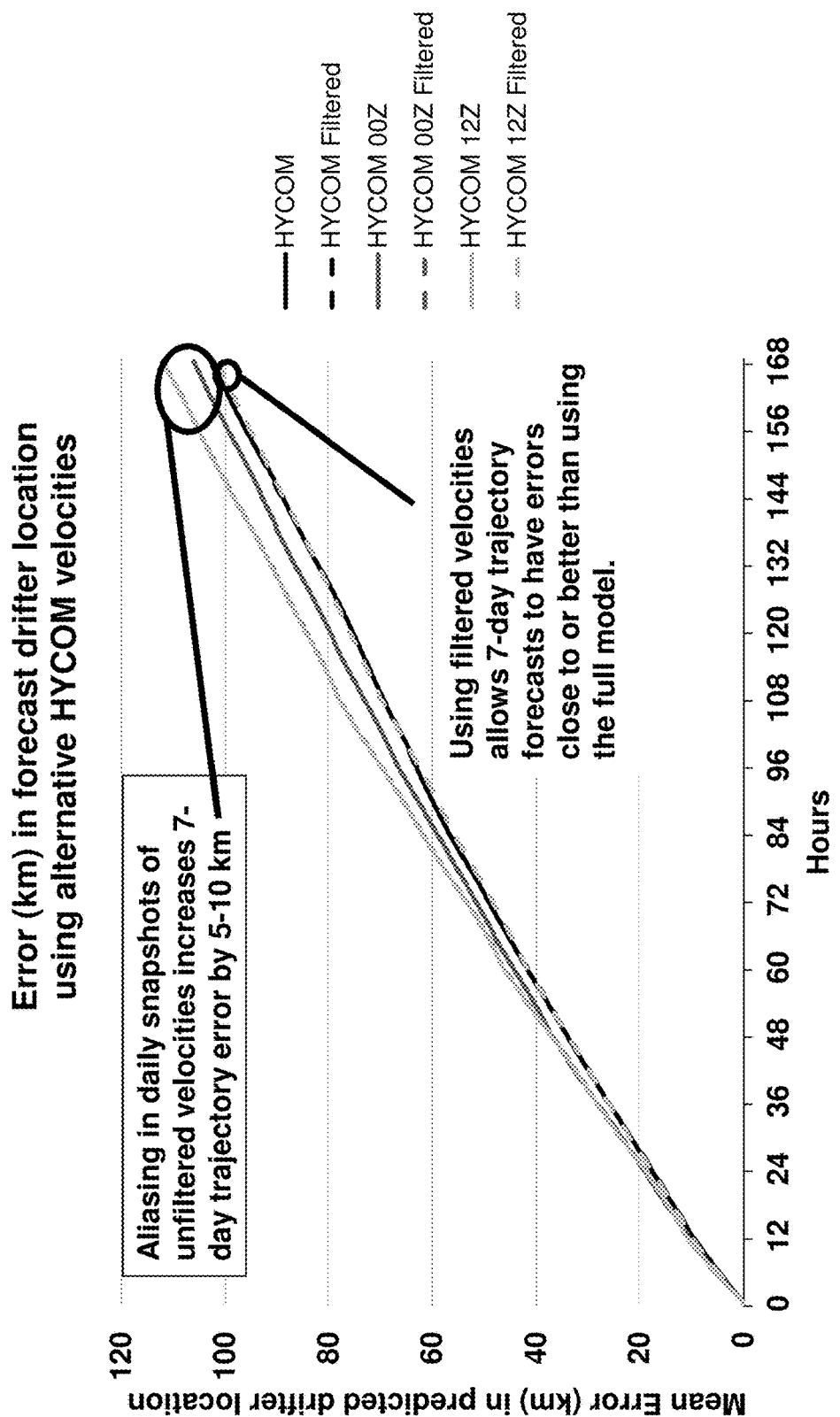
FIG. 8 is a plot illustrating the mean separation between predicted and observed drift locations as a function of days after the initial prediction.
Figure 9:
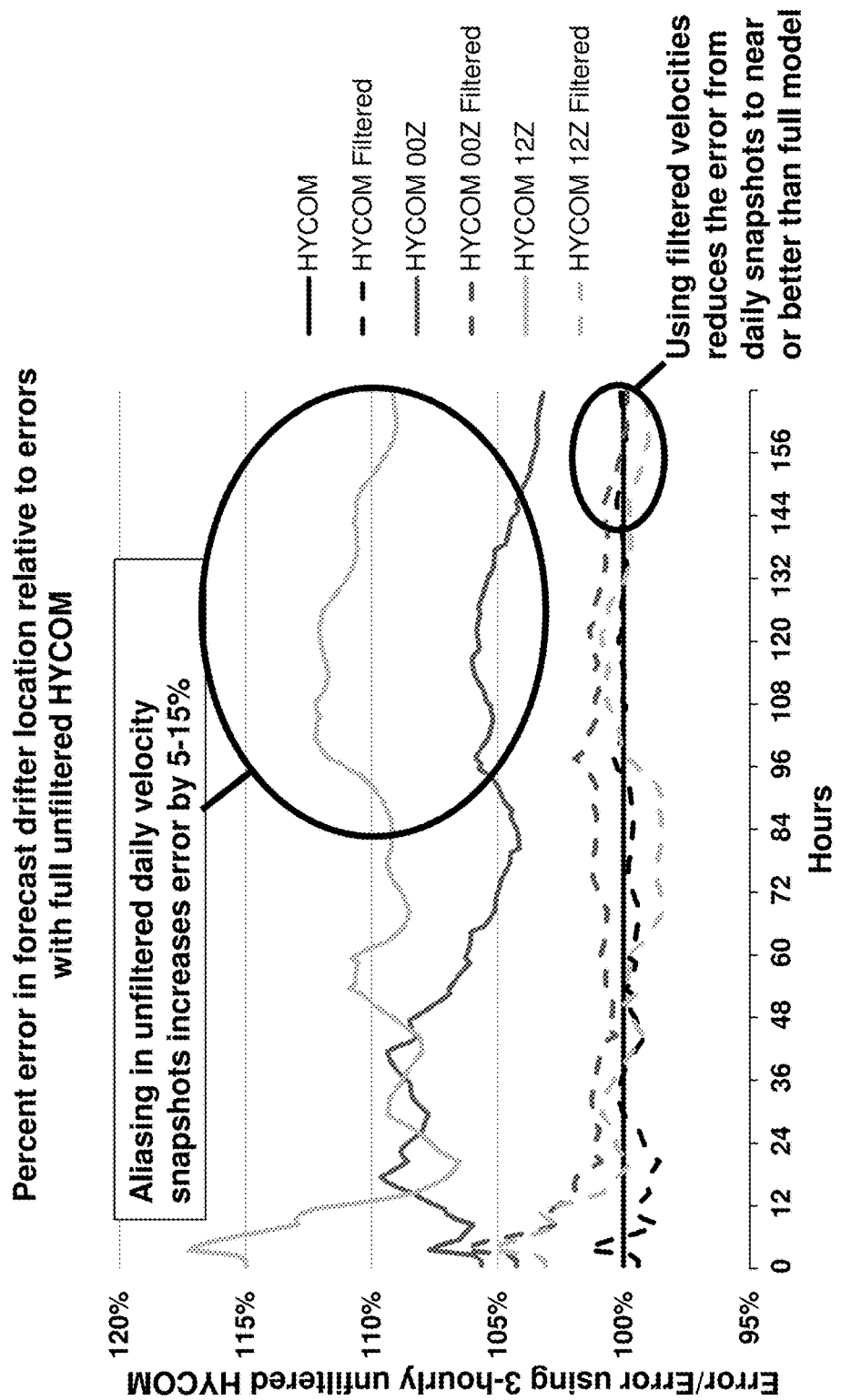
FIG. 9 is a plot illustrating the same case as FIG. 8 but expressed in percent error relative to the errors in the control run.
Figure 10:
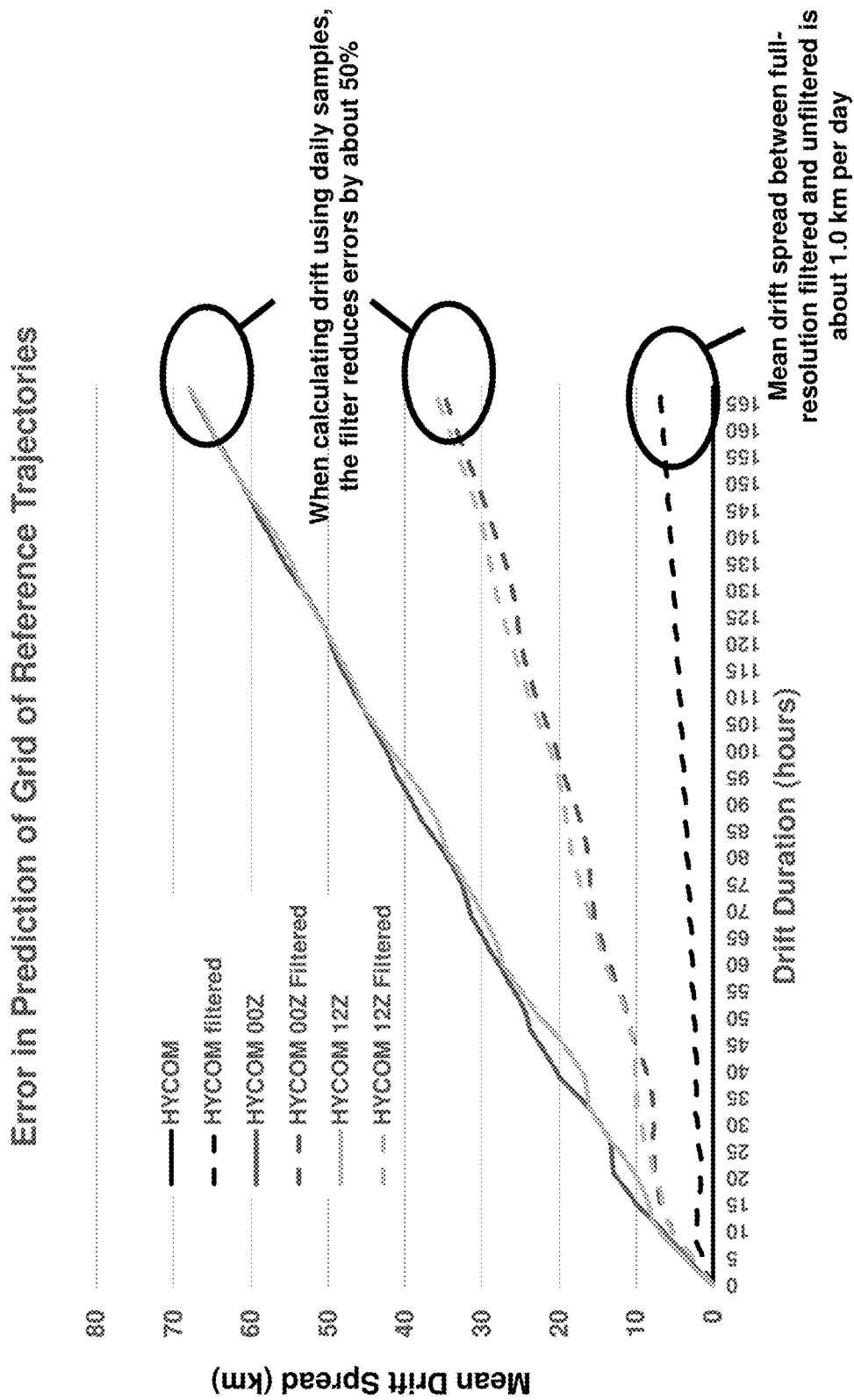
FIG. 10 is a plot illustrating the impact of the filter in the ideal case in which the original three-hour time series is actually the perfect representation of the true velocity and the true trajectories are available in an even distribution over the three months of the Indian Ocean region.

FIGS. 8, 9, and 10 are plots illustrating some of the advantageous results obtained using a system and method for isolating the inertial and non-inertial components of a velocity field in accordance with the present invention.

FIG. 8 is a plot illustrating mean separation between predicted and observed drift locations as a function of days after the initial prediction. These are the mean over drifter observations in a south Indian Ocean region during January-February 2014. The solid curves indicate errors in drift prediction using unfiltered velocities, while the dashed curves indicate errors in predictions using filtered currents. The black curves use a 3-hourly time series velocity fields, while the dark gray and light gray fields (labeled in the legend as "HYCOM 00Z" and "HYCOM 12Z," respectively) subsample the velocity fields once per day, with the dark gray HYCOM 00Z curve showing the effect of daily samples at 00 hours UTC and the light gray HYCOM 12Z curve samples at 12 UTC. The gray curves illustrate the impact of the common practice of using a single velocity field each day to represent the actual flow. In this case, the impact of the filter on the cases using 3-hour velocity fields was small; aliasing is small if the full time series is used, and effect of the incorrect inertial oscillations tends to average out over time. However, if the daily fields are used then the inertial oscillations are aliased into the mean drift; the filtered predictions reduce the errors to a level similar to the high frequency calculations. Thus use of the filters allows similarly accurate flow predictions but requires only 12.5% of the data.

FIG. 9 is a plot illustrating the same case as FIG. 8 but expressed in percent error relative to the errors in the control run. Predictions of all cases are evaluated according to the mean separation between their predicted drifter trajectories and the reports of independent drifters in the Indian Ocean region from January-February 2014. If a prediction has the same mean error as the control case, the drifter trajectories predicted using the full 3-hourly unfiltered time series, then the error ratio at that time would show 100%. Errors in predictions using filtered velocities are generally within 1% of the control run, while the unfiltered daily time series produces 5-15% higher errors.

FIG. 10 is a plot illustrating the impact of the filter in the ideal case in which the original three-hour time series is actually the perfect representation of the true velocity and the true trajectories are available in an even distribution over the three months of the Indian Ocean region. In this case, filtering the full time series would result in an error of about 1.0 km per day, which can be understood as a background uncertainty in this region due to sampling inertial oscillations every three hours rather than continuously. If the fields are sampled daily, as in the solid lines, aliasing the inertial oscillations introduces an error of about 10 km per day. Filtering the inertial oscillations reduce the error by about 50%, leaving a base error of about 5 km per day, the foundation level of error that would result from sampling perfect predictions only once per day. In the real world predictions are imperfect, so these indicate the minimum uncertainty levels associated with these treatments. Even so, application of the inertial oscillation filter leads to as much as a 50% improvement in trajectory forecasting in accordance with one or more aspects of the present invention.

Embodiments of the present teachings are directed to computer systems such as system 200 (FIG. 2) for accomplishing the methods such as method 310 (FIG. 3A), method 320 (FIG. 3B), and method 330 (FIG. 3C) described herein, and also are directed to computer readable media containing programs for accomplishing these methods. The raw data and results can be stored for future retrieval and processing, printed, displayed, transferred to another computer, and/or transferred elsewhere. Communications links such as electronic communications 229 (FIG. 2) can be wired or wireless, for example, using cellular communication systems, military communications systems, and satellite communications systems. In an exemplary embodiment, the software for the system was written using FORTRAN and MATLAB, but one skilled in the art will recognize that any suitable programming language or programming methodology can be used. In addition, the system can operate on a computer having a variable number of CPUs and can be implemented on any suitable computer platform such as WINDOWS-based or LINUX-based platform. All such embodiments are within the scope and spirit of the present disclosure.

The present invention is also directed to software for accomplishing the methods discussed herein, and computer readable media storing software for accomplishing these methods. The various modules described herein can be accomplished on the same CPU, or can be accomplished on different computers. In compliance with the statute, the present invention has been described in language more or less specific as to structural and methodical features. It is to be understood, however, that the present invention is not limited to the specific features shown and described, since the means herein disclosed comprise preferred forms of putting the present invention into effect.

Methods such as methods 310 (FIG. 3A), 320 (FIG. 3B), and 330 (FIG. 3C) of the present invention can be, in whole or in part, implemented electronically. Signals representing actions taken by elements of the system and other disclosed embodiments can travel over at least one live communications network 229 (FIG. 2). Control and data information can be electronically executed and stored on at least one computer-readable medium.

System 200 (FIG. 2) can be implemented to execute on at least one computer node in at least one live communications network 229 (FIG. 2). Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form including, Graphic Interchange Format (GIF), Joint Photographic Experts Group (JPEG), Portable Network Graphics (PNG), Scalable Vector Graphics (SVG), and Tagged Image File Format (TIFF).

Advantages and New Features

The system and method for filtering inertial oscillations from a velocity field in accordance with the present invention provides at least the following advantages over the prior art systems and methods that do not adequately filter such inertial oscillations.

The approach of the present invention removes inertial oscillations, which are prone to persistent phase errors, while retaining rapid changes or short-term pulses in the velocity field, fields where phase errors are more easily accommodated in integrated trajectories and whose more random nature is less subject to aliasing and more easily averaged out in integrated trajectories.

The velocity fields resulting from the filtering out of the inertial oscillations are easier to visually interpret and use as a daily field requiring less communication bandwidth and storage, thus the conclusions based on the velocity data will be easier to apply and will provide more reliably accurate predictions.

The system and method in accordance with the present invention strongly also reduces the errors introduced by subsampling the velocity field in time, enabling more efficient use of available bandwidth (for example, when using low-bandwidth acoustic communications with submarines or autonomous underwater vehicles. The resulting estimates of drift velocity and drift trajectories can reduce errors in locating objects in the ocean with minimal additional cost.

In addition, the method is model-independent and can be applied to any velocity field in real time or in post-processing;

Finally, the method for filtering inertial oscillations in accordance with the present invention can be applied to any velocity fields, including those for atmospheres on other planets, where there is an oscillatory mode that is subject to random phase errors.

Although particular embodiments, aspects, and features have been described and illustrated, it should be noted that the invention described herein is not limited to only those embodiments, aspects, and features, and it should be readily appreciated that modifications may be made by persons skilled in the art. The present application contemplates any and all modifications within the spirit and scope of the underlying invention described and claimed herein, and all such embodiments are within the scope and spirit of the present disclosure.

What is claimed is:

1. A method for navigating an object in a body of water, the method comprising:
   (a) receiving data of a velocity field in a geographic area in a body of water, the velocity field comprising a plurality of water velocities at a corresponding plurality of associated locations in a two-dimensional (2D) geographic model representing the body of water, each velocity having an inertial component and a non-inertial component, the inertial component of each velocity corresponding to an inertial oscillation of the body of water at the location associated with the velocity, and each associated location being identified by its latitude and longitude;
   (b) for each location in the 2D geographic model, determining a corresponding inertial period, the inertial period being a temporal period of the inertial oscillation of the body of water at the latitude of that location;
   (c) receiving a specification of a specified time period over which the velocity data is to be analyzed, the specified time period comprising a series of specified time steps;
   (d) receiving data of the velocity field for each time step, the data at each time step comprising data of the velocities in the velocity field at that time step;
   (e) for each time step, calculating a weighted average of velocities within the inertial period of a specified location in the velocity field, the weighted average comprising an isolated non-inertial component of the velocities at the specified location at that time step,
      wherein the weighted average at each time step is calculated by multiplying each of the velocities within the inertial period by at most a factor equal to a period of the time step,
         each of the velocities at a beginning and/or an end of the inertial period being multiplied by a value corresponding to a prorated percentage of the time step, determined by an extent in the time step to which the inertial period encompassing those velocities extends beyond the beginning of the time step, and each of the remaining velocities within the inertial period being multiplied by a value corresponding to the entire time step; summing the multiplied velocities, and dividing the summed velocities by the inertial period;

(f) repeating steps (b)-(e) for each location in the velocity field to obtain respective isolated non-inertial components of the velocities at each location in the velocity field;

(g) determining a path for the object in the 2D geographic model such that the determined path enables the object to decrease average fuel consumption, wherein the determined path is determined by integrating a motion of the object using the isolated non-inertial components of the velocities in the velocity field near to a trajectory of the object; and (h) navigating the object in the body of water according to the determined path.

2. A method for identifying a location for placing an object in a body of water so that the object travels to a desired destination location, the method comprising:

(a) receiving data of a velocity field in a geographic area in a body of water, the velocity field comprising a plurality of water velocities at a corresponding plurality of associated locations in a two-dimensional (2D) geographic model representing the body of water, each velocity having an inertial component and a non-inertial component, the inertial component of each velocity corresponding to an inertial oscillation of the body of water at the location associated with the velocity, and each associated location being identified by its latitude and longitude;

(b) receiving data of the desired destination location for an object placed in the body of water;

(c) for each location in the 2D geographic model, determining a corresponding inertial period, the inertial period being a temporal period of the inertial oscillation of the body of water at the latitude of that location;

(d) receiving a specification of a specified time period over which the velocity data is to be analyzed, the specified time period comprising a series of specified time steps;

(e) receiving data of the velocity field for each time step, the data at each time step comprising data of the velocities in the velocity field at that time step;

(f) for each time step, calculating a weighted average of velocities within the inertial period of a specified location in the velocity field, the weighted average comprising an isolated non-inertial component of the velocities at the specified location at that time step, wherein the weighted average at each time step is calculated by multiplying each of the velocities within the inertial period by at most a factor equal to a period of the time step,
each of the velocities at a beginning and/or an end of the inertial period being multiplied by a value corresponding to a prorated percentage of the time step, determined by an extent in the time step to which the inertial period encompassing those velocities extends beyond the beginning of the time step, and each of the remaining velocities within the inertial period being multiplied by a value corresponding to the entire time step; summing the multiplied velocities, and dividing the summed velocities by the inertial period;

(g) repeating steps (c)-(f) for each location in the velocity field to obtain respective isolated non-inertial components of the velocities at each location in the velocity field;

(h) determining a path of the object in the 2D geographic model by integrating a motion of the object using the isolated non-inertial components of the velocities in the velocity field near to a trajectory of the object; and (i) positioning the object in the body of water according to the determined path so that the object reaches the desired destination location.

3. A method for navigating an object in a body of water, the method comprising:

(a) receiving data of a velocity field in a geographic area in a body of water, the velocity field comprising a plurality of water velocities at a corresponding plurality of associated locations in a two-dimensional (2D) geographic model representing the body of water, each velocity having an inertial component and a non-inertial component, the inertial component of each velocity corresponding to an inertial oscillation of the body of water at the location associated with the velocity, and each associated location being identified by its latitude and longitude;

(b) for each location in the 2D geographic model, determining a corresponding inertial period, the inertial period being a temporal period of the inertial oscillation of the body of water at the latitude of that location;

(c) receiving a specification of a specified time period over which the velocity data is to be analyzed, the specified time period comprising a series of specified time steps;

(d) receiving data of the velocity field for each time step, the data at each time step comprising data of the velocities in the velocity field at that time step;

(e) for each time step, calculating a weighted average of velocities within the inertial period of a specified location in the velocity field, the weighted average comprising an isolated non-inertial component of the velocities at the specified location at that time step, wherein the weighted average at each time step is calculated by multiplying each of the velocities within the inertial period by at most a factor equal to a period of the time step, each of the velocities at a beginning and/or an end of the inertial period being multiplied by a value corresponding to a prorated percentage of the time step, determined by an extent in the time step to which the inertial period encompassing those velocities extends beyond the beginning of the time step, and each of the remaining velocities within the inertial period being multiplied by a value corresponding to the entire time step; summing the multiplied velocities, and dividing the summed velocities by the inertial period;

(f) for each velocity in the velocity field associated with the specified location, subtracting the weighted average of velocities found in step (e) from the velocity to obtain the isolated inertial component of the velocity at the specified location;

(g) repeating steps (b)-(f) for each location in the velocity field to obtain respective isolated inertial components and respective isolated non-inertial components of the velocities at each location in the velocity field;

(h) determining a path for the object in the 2D geographic model such that the determined path enables the object to decrease average fuel consumption, wherein the determined path is determined by integrating a motion of the object using the isolated non-inertial components of the velocities in the velocity field near to a trajectory of the object; and (i) navigating the object in the body of water according to the determined path.

* * * * *